United States Patent
Howes et al.

(10) Patent No.: US 9,518,786 B2
(45) Date of Patent: Dec. 13, 2016

(54) HEAT STORAGE SYSTEM

(75) Inventors: Jonathan Sebastian Howes, Hampshire (GB); James Macnaghten, Hampshire (GB)

(73) Assignee: Energy Technologies Institute LLP, Loughborough (GB)

( * ) Notice: Subject to any disclaimer, the term of this patent is extended or adjusted under 35 U.S.C. 154(b) by 713 days.

(21) Appl. No.: 13/580,630

(22) PCT Filed: Feb. 24, 2011

(86) PCT No.: PCT/GB2011/050370
§ 371 (c)(1),
(2), (4) Date: Aug. 22, 2012

(87) PCT Pub. No.: WO2011/104556
PCT Pub. Date: Sep. 1, 2011

(65) Prior Publication Data
US 2012/0312496 A1 Dec. 13, 2012

(30) Foreign Application Priority Data

Feb. 24, 2010 (GB) .................................. 1003105.2

(51) Int. Cl.
*F01K 3/12* (2006.01)
*F02C 6/16* (2006.01)
(Continued)

(52) U.S. Cl.
CPC ............... *F28D 17/005* (2013.01); *F01K 3/12* (2013.01); *F02C 6/16* (2013.01); *F02D 41/005* (2013.01);
(Continued)

(58) Field of Classification Search
CPC .... F28D 17/005; F28D 17/04; F28D 20/0052; F28D 20/023; F28D 20/28; F28D 2020/006; F28D 2020/082; F01K 3/12; F02C 6/16; H02J 15/006
(Continued)

(56) References Cited

U.S. PATENT DOCUMENTS 4,190,099 A * 2/1980 Despois .......................... 165/45
4,353,214 A 10/1982 Gardner
(Continued)

FOREIGN PATENT DOCUMENTS

AT 118225 6/1930
CA 2440459 A1 9/2002
(Continued)

OTHER PUBLICATIONS

U.K. Search Report dated May 20, 2010, 3 pages.
(Continued)

*Primary Examiner* — Len Tran
*Assistant Examiner* — Hans Weiland
(74) *Attorney, Agent, or Firm* — Lempia Summerfield Katz LLC

(57) ABSTRACT

Apparatus (1) for storing energy includes a high pressure storage vessel (10) for receiving high pressure gas, the high pressure storage vessel (10) including a high pressure heat store including a first chamber housing a first gas-permeable heat storage structure (14); and a low pressure storage vessel (11,12) for receiving low pressure gas, the low pressure storage vessel (11,12) including a low pressure heat store including a second chamber housing a second gas-permeable heat storage structure (16,18. The first heat storage structure (14) has a mean surface area per unit volume which is higher than a mean surface area per unit volume of the second heat storage structure (16,18).

20 Claims, 11 Drawing Sheets

(51) Int. Cl.

| | | |
|---|---|---|
| *F02D 41/00* | (2006.01) | |
| *F22B 1/00* | (2006.01) | |
| *F28D 17/00* | (2006.01) | |
| *F28D 17/04* | (2006.01) | |
| *F28D 20/00* | (2006.01) | |
| *H02J 15/00* | (2006.01) | |

(52) U.S. Cl.
 CPC .............. *F22B 1/006* (2013.01); *F28D 17/04* (2013.01); *H02J 15/006* (2013.01); *F28D 2020/0082* (2013.01); *Y02E 60/15* (2013.01); *Y02T 10/47* (2013.01)

(58) Field of Classification Search
 USPC ......... 165/7, 10, 236; 60/416, 641.8–641.15, 60/659
 See application file for complete search history.

(56) References Cited

U.S. PATENT DOCUMENTS

| | | | |
|---|---|---|---|
| 7,900,450 | B2 | 3/2011 | Gurin |
| 8,627,665 | B2 * | 1/2014 | Ruer ................................ 60/659 |
| 2006/0201163 | A1 | 9/2006 | Haefner et al. |
| 2008/0034756 | A1 | 2/2008 | Spalte |
| 2008/0066736 | A1 * | 3/2008 | Zhu .............................. 126/620 |
| 2009/0064680 | A1 | 3/2009 | Ustun |
| 2009/0194250 | A1 | 8/2009 | Kudo |
| 2010/0218500 | A1 | 9/2010 | Ruer |
| 2010/0301614 | A1 | 12/2010 | Ruer |
| 2011/0094231 | A1 * | 4/2011 | Freund ........................... 60/727 |

FOREIGN PATENT DOCUMENTS

| | | |
|---|---|---|
| CN | 2769822 | 4/2006 |
| CN | 1777782 | 5/2006 |
| CN | 1926331 | 3/2007 |
| CN | 101023253 A | 8/2007 |
| CN | 101413719 | 4/2009 |
| DE | 24 19 9778 | 9/1975 |
| DE | 2419778 | 9/1975 |
| FR | 2254224 | 7/1975 |
| GB | 2 236 808 | 4/1991 |
| WO | WO 2008/148962 | 12/2008 |
| WO | WO 2009/044139 | 4/2009 |
| WO | WO 2009/053593 | 4/2009 |
| WO | 2009158184 A1 | 12/2009 |

OTHER PUBLICATIONS

International Search Report and Written Opinion in International Patent Application No. PCT/GB2011/050370, dated Nov. 25, 2011, 17 pages.

Chinese Office Action dated Jun. 5, 2014 for corresponding Chinese Patent Application CN 201180021711.1.

\* cited by examiner

1 Discharging
2 Discharging
3 Charged; Pressure lowering
4 Charging
5 Discharged; Pressure rising

HEAT STORAGE SYSTEM

RELATED APPLICATION DATA

This U.S. national phase application is based on international application no. PCT/GB2011/050370, filed on Feb. 24, 2011, which claimed priority to British national patent application no. 1003105.2, filed on Feb. 24, 2010. Priority benefit of these earlier filed applications is hereby claimed.

BACKGROUND

1. Field of the Disclosure

The present invention relates to apparatus for storing energy, and particularly but not exclusively to apparatus for receiving and returning energy in the form of electricity (hereinafter referred to as "electricity storage" apparatus).

2. Description of the Related Art

A number of systems have been proposed for electricity storage that store the heat of compression of air and absorb the work of expansion of air.

A commonly proposed example of this is called Adiabatic CAES where a salt cavern is typically used as a compressed air store. When electricity is to be stored a motor drives a compressor to compress air into the cavern. The compression process raises the temperature of the air and to allow efficient energy recovery it is necessary to store this 'heat of compression' in some form of thermal store.

The cavern will normally be kept at a minimum pressure, such as 40 bar, and this is increased to a higher limit, for example 60 bar, during charging. These pressures are likely to generate a peak temperature, using air, in the region of 650 degrees C. This is normally either transferred to an unpressured thermal store by a heat exchanger or stored directly in a thermal storage matrix contained within a pressurised vessel. To recover the electricity the process is reversed and the compressed gas is reheated by the thermal store prior to expansion. The work of expansion is used to drive a generator to generate electricity.

If a heat exchanger is used rather than a thermal storage matrix in a pressurised vessel, the aim is to store the heat with only a small difference between the compressed air temperature and the storage material temperature, such that when the process is reversed the air is heated to near its original temperature.

This sort of heat exchange is extremely difficult to achieve because there are no heat transfer liquids that operate in the range 0-650 degrees C. This means that either multiple liquids must be used or the heat exchange is via a gas, which means a gas to gas heat exchanger.

Multiple heat transfer liquids are difficult to manage, require multiple storage vessels and are generally expensive, but they can operate efficiently and avoid the cost of heavily pressurised vessels.

With gas to gas heat exchangers the temperature range requires the use of quality steels and the gas flows require very large heat exchangers to avoid pressure drop. The result of this is that these heat exchangers are normally both very expensive and not very efficient, with a large temperature difference, such as 50 degrees C., after each heat transfer process.

The most efficient solution is to use a thermal storage matrix, such as a particulate structure, contained within an insulated pressure vessel and to transfer the heat to and from the gas in a manner that is similar to a very large regenerator. This has the best heat transfer, but the storage mass must all be contained within the pressure vessel, which is very expensive.

SUMMARY

Accordingly, the present applicant has appreciated the need for an improved energy storage system which overcomes, or at least alleviates, some of the problems associated with the prior art.

In accordance with a first aspect of the present invention, there is provided apparatus for storing energy, comprising: a high pressure storage vessel for receiving high pressure gas, the high pressure storage vessel comprising high pressure heat storage means for receiving thermal energy from gas; and connection means for connecting the high pressure storage vessel to gas storage means for storing high pressure gas after exposure to the high pressure heat storage means or to gas processing means for receiving high pressure gas after exposure to the high pressure heat storage means; wherein the apparatus further comprises: a low pressure storage vessel (e.g. suitable for receiving gas at low pressure only) comprising low pressure heat storage means for receiving thermal energy from gas, the low pressure storage vessel being selectively connectable to the high pressure storage vessel; and gas transfer means for transferring gas at low pressure between the high pressure storage vessel and the low pressure storage vessel, whereby stored thermal energy is transferred between the high pressure heat storage means and the low pressure heat storage means by passing low pressure gas between the high pressure storage vessel and the low pressure storage vessel (i.e. direct without use of a heat exchanger).

In this way, apparatus for storing energy is provided in which thermal energy is transferred from heat storage means contained in a storage vessel configured to contain a high pressure gas to heat storage means contained in a storage vessel configured to maintain a low gas pressure (e.g. low pressure or unpressurised storage vessel) with heat being transferred direct (i.e. between the gas and solid heat storage means on both the high pressure and low pressure side). Accordingly, the invention offers the potential of providing a high-efficiency thermal store with a performance similar to direct heat exchange at a cost that is near that of using unpressurised stores. The invention may be applicable to Adiabatic CAES techniques and to the improved energy storage apparatus disclosed in the applicant's earlier application WO 2009/044139 (in which an additional "cold store" is generated by expanded gas during a charging phase and is subsequently used to cool gas prior to compression in a discharging phase) and also solar thermal power generation. Furthermore, since high pressure gas heated during a discharge phase (e.g. high pressure gas retrieved from the gas storage means or gas processing means which is passed through the high pressure heat storage means) may be subsequently expanded during a subsequent energy retrieval step, the high pressure gas may additionally act as the working fluid for expansion (e.g. in the electricity generation stage).

In one embodiment, the high pressure storage vessel is configured to receive heated high pressure gas from a gas source. In one embodiment, the gas source comprises a compressed gas source. For example, the apparatus may comprise compressor means for compressing a gas and the high pressure storage vessel is configured to receive gas compressed by the compressor means. The compressor means may be powered by an electricity supply. In this way, the apparatus may be used to convert electrical energy into stored thermal energy for subsequent recovery by the apparatus. In another embodiment, the gas source comprises a solar collector. In these embodiments, thermal energy stored by the high pressure heat storage means is transferred to the low pressure heat storage means by passing gas at low pressure between the high pressure storage vessel and the low pressure storage vessel (e.g. cyclically with a proportion of the thermal energy stored by the high pressure heat storage means being transferred to the low pressure heat storage means during each cycle).

In another embodiment, the low pressure storage vessel is configured to receive heated low pressure gas from a gas source. In one embodiment, the gas source comprises a solar collector. Advantageously, this arrangement allows heat to be collected and stored at low (potentially ambient) pressure thereby reducing issues associated with leakage from a high pressure system.

The gas storage means may have a substantially larger volume than that of the high or low pressure storage vessels (e.g. with a gas storage volume at least 1000 times the storage capacity of the apparatus). For example, the gas storage means may be a pressurised underground cavern, such as a salt dome, an aquifer or other suitable underground space. Alternatively it may be a pressure vessel. It may be either a fixed-volume space, a fixed-pressure space or a combination of both.

The gas processing means may comprise expander means for expanding high pressure gas received from the high pressure storage vessel during a charge phase. The gas processing means may further comprise further heat storage means (e.g. cold storage means housed in a cold storage vessel) for transferring thermal energy to gas expanded by the expander means. The apparatus may be configured to operate with gas passing between the high pressure storage vessel and the further heat storage means in a closed cycle (e.g. with gas being warmed (in a charge phase) by exposure to the further heat storage means prior to compression by the compression means to heat the pressurised gas).

At least one of the high pressure heat storage means and the low pressure heat storage means comprises a chamber for receiving gas, and particulate material housed in the chamber. The particulate material may comprises solid particles and/or porous media and/or fibres and or foamed material (e.g. metallic, mineral or ceramic particles and/or fibres and/or foam) packed to form a gas-permeable heat storage means.

The high pressure heat storage means and low pressure heat storage means may be identical. However, the high pressure heat storage means and low pressure heat storage means may be different. For example, the high pressure heat storage means may be configured to provide a thermal charge/discharge efficiency which is higher (e.g. substantially higher) than that of the low pressure heat storage means. In one embodiment, the high pressure heat storage means has a surface area to volume ratio which is higher (e.g. substantially higher, for example 2, 4 or even 10 times higher) than that of the low pressure heat storage means. In addition, or alternatively, the high pressure heat storage means may have a higher (e.g. substantially higher, for example 2, 4 or even 10 times higher) conductivity than the low pressure heat storage means. In addition, or alternatively, the high pressure heat storage means may have a smaller (e.g. substantially smaller, for example 2, 4 or even 10 times smaller) mean particle size than the low pressure heat storage means. In this way, the high pressure heat storage means may be advantageously configured to receive and transmit thermal energy quickly to generate a sharp thermal front and thereby improve the efficiency of regular charging/discharging of the high pressure storage means.

In one embodiment, the low pressure heat storage means may advantageously have a different storage material and shape, such that the volumetric heat capacity, (gas) pressure drop through the store, void fraction, and conductivity and size of the particle are different than that of the high pressure heat storage means. For example, the low pressure heat storage means may comprise a mineral particulate, such as gravel, and the high pressure storage means a random fine copper fibre mesh or foamed metal.

The low pressure heat storage means may have a substantially larger volume (e.g. 5 times, 10 times or even 100 times) than the high pressure storage means. In addition the cross-sectional area and length of the stores may vary to reduce pressure drop or to change the profile of the thermal front of gas passing through the stores.

The high pressure heat storage means may comprise a thermal matrix for directly receiving thermal energy from the gas. The low pressure heat storage means may comprise a thermal matrix for directly receiving thermal energy from gas. For example, at least one of the low pressure and high pressure heat storage means may comprise a particulate thermal storage medium.

In one embodiment, the gas transfer means comprises pump means.

The apparatus may further comprise pressure reducing means for reducing pressure of gas stored in the high pressure storage vessel prior to connection to the low pressure storage vessel. In one embodiment, the pressure reducing means comprises expander means and the energy of expansion is recoverable by the apparatus. (e.g. in the form of electricity or being used directly to raise the pressure in a different high pressure vessel—see below)

The apparatus may further comprise pressure increasing means for increasing pressure of gas stored in the high pressure storage vessel after disconnection of the high pressure storage vessel from the low pressure storage vessel.

In one embodiment, the apparatus comprises a further high pressure storage vessel (e.g. as previously defined) for receiving high pressure gas (e.g. compressed by the compressor means), the further high pressure storage vessel being connectable to the gas storage means or gas processing means via the connection means and comprising a further high pressure heat storage means for receiving thermal energy from the high pressure gas.

The first-mentioned high pressure storage vessel and further high pressure storage vessel may be configured to be alternately chargeable. In one embodiment, the apparatus is configured to substantially continuously supply received high pressure gas (e.g. compressed by the compressor means) to the alternately chargeable first-mentioned high pressure storage vessel and further high pressure storage vessel. In this way, the heat transfer process is effectively continuous for either charging or discharging of the apparatus.

In one embodiment, the apparatus comprises a further low pressure storage vessel (e.g. as previously defined) comprising a further low pressure heat storage means for receiving thermal energy from gas. For example, the apparatus may comprise a plurality of further low pressure storage vessels each as previously defined (e.g. ten or twenty low pressure storage vessels) each comprising a further low pressure heat storage means for receiving thermal energy from gas.

The further low pressure storage vessel may be selectively connectable to at least one of the first-defined or the further high pressure storage vessel. In one embodiment, the apparatus is configured to charge the first-mentioned and further low pressure heat storage means in series, in parallel or a combination of both.

In one embodiment, the first-mentioned low pressure storage vessel maintains gas at a first pressure and the further low pressure storage vessel maintains gas at a second pressure different to the first pressure.

In the case of apparatus comprising the further high pressure storage vessel, the apparatus may further comprise pressure reducing means for reducing pressure of gas stored in each high pressure storage vessel prior to connection of each high pressure storage vessel to the first-mention or the further low pressure storage vessel. In addition, or instead, the apparatus may further comprise pressure increasing means for increasing pressure of gas stored in each high pressure storage vessel after disconnection of each high pressure storage vessel from the first-mentioned or the further low pressure storage vessel.

In one embodiment, the pressure reducing means comprises expander means and the energy of expansion recovered during pressure reduction in one of the high pressure storage vessels is recoverable by the apparatus. For example, in one embodiment the energy of expansion recovered is used by the pressure increasing means to increase pressure in another of the high pressure storage vessels.

The apparatus may comprise at least two yet further high pressure storage vessels (e.g. each as previously defined) for receiving high pressure gas (e.g. compressed by the compressor means or heated by the solar collector), each yet further high pressure storage vessel being connectable to the gas storage means or gas processing means via the connection means and comprising a yet further high pressure heat storage means for receiving thermal energy from the high pressure gas.

In one embodiment, the apparatus is operable in a charging mode in which at any one time: one of the high pressure storage vessels is charged with high pressure gas (e.g. compressed by the compressor means or heated by the solar collector); one of the high pressure storage vessels contains gas having its pressure reduced by the pressure reducing means; one of the high pressure storage vessels contains gas being transferred between the high pressure storage vessel and the low pressure storage vessel by gas transfer means; and one of the high pressure storage vessels contains gas having its pressure increased by the pressuring increasing means. In this way, at least one high pressure storage vessel and at least one low pressure storage vessel can be charged at any one time to provide continuous high and low pressure charging of the apparatus.

The apparatus may comprise at least one yet further high pressure storage vessel (e.g. as previously defined) for receiving high pressure gas (e.g. compressed by the compressor means or heated by the solar collector), the at least one yet further high pressure storage vessel being connectable to the gas storage means or gas processing means via the connection means and comprising a yet further high pressure heat storage means for receiving thermal energy from the high pressure gas. In this way, at least two high pressure storage vessels may be operable to supply low pressure gas to the low pressure storage vessel(s) at the same time. In one embodiment, the apparatus is operable in a charging mode to transfer low pressure gas from the first-mentioned and further high pressure storage vessels at the same time, each at a lower rate of transfer than the apparatus is configured to receive high pressure gas (e.g. from the compressor means or solar collector). In addition, or alternatively, the apparatus may be operable in a discharging mode to transfer low pressure gas to the first-mentioned and further high pressure storage vessels at the same time, each at a lower rate of transfer than the apparatus is configured to discharge high pressure gas. In this way, rapid cycling of low pressure gas may be carried out between the high pressure storage vessels and the low pressure storage vessel(s) in order to reduce the pumping losses (or pressure drop) from the low pressure flow through the vessels whilst maintaining a balanced input of pressurised gas during charging/output of pressurised gas during discharging.

The gas may be air, argon or neon, or another suitable gas. For example, the gas may comprise air from the surrounding atmosphere.

The first-mentioned low pressure storage vessel or further low pressure storage vessel may store gas at substantially atmospheric pressure.

The apparatus may further comprise expander means for recovering energy stored in the apparatus (e.g. in a discharge phase). In one embodiment, the compressor means and expander means are provided by a combined compressor/expander device configured to be selectively operable in a compression mode or an expansion mode.

In accordance with a second aspect of the present invention, there is provided a method of storing and subsequently retrieving energy, comprising: during a charge phase: receiving a heated high pressure gas; transferring the high pressure gas to gas storage means or gas processing means via a high pressure storage vessel comprising high pressure heat storage means for receiving thermal energy from the gas; transferring gas from the high pressure storage vessel at low pressure (e.g. by reducing the pressure of gas contained in the high pressure storage vessel) between the high pressure storage vessel and a low pressure storage vessel comprising low pressure heat storage means for receiving thermal energy from gas, whereby thermal energy stored by the high pressure heat storage means is transferred to the low pressure heat storage means by low pressure gas passing between the high pressure storage vessel and the low pressure storage vessel; and during a discharge phase: transferring gas at low pressure between the low pressure storage vessel and the high pressure storage vessel, whereby thermal energy stored by the low pressure heat storage means is transferred to the high pressure heat storage means by low pressure gas passing between the low pressure storage vessel and the high pressure storage vessel; subsequently passing gas at high pressure (e.g. using high pressure gas retrieved from the gas storage means or gas processing means) through the high pressure storage vessel to expose the gas to the high pressure heat storage means; and expanding the heated high pressure gas.

In this way, a method of storing heat from high pressure gas is provided using a low pressure store with direct heat transfer (i.e. direct between the gas and solid heat storage means without using a heat exchanger).

In one embodiment, gas is transferred cyclically between the high pressure storage vessel and the low pressure storage vessel during the charge phase, and gas is transferred cyclically between the low pressure storage vessel and high pressure storage vessel during the discharge phase.

In one embodiment, the high pressure heated gas is received from a gas source. In one embodiment the gas source is a compressed gas source. In another embodiment, the gas source is a solar collector.

All of the previously defined features of the first aspect of the invention may form features of the second aspect of the invention.

In accordance with a third aspect of the present invention, there is provided a method of storing and subsequently retrieving energy, comprising: during a charge phase: receiving a heated low pressure gas; passing the gas through a low pressure storage vessel comprising low pressure heat storage means for receiving thermal energy from the gas; and during a discharge phase: transferring gas from the low pressure storage vessel at low pressure between the low pressure storage vessel and a high pressure storage vessel comprising high pressure heat storage means for receiving thermal energy from gas, whereby thermal energy stored by the low pressure heat storage means is transferred to the high pressure heat storage means by low pressure gas passing between the low pressure storage vessel and the high pressure storage vessel; subsequently passing gas at high pressure through the high pressure storage vessel to expose the high pressure gas to the high pressure heat storage means; and expanding the heated high pressure gas.

In this way, a method of storing heat from low pressure gas is provided with direct heat transfer (i.e. direct between the gas and solid heat storage means without using a heat exchanger) between the low pressure store and a high pressure store.

In one embodiment, the low pressure heated gas is received from a gas source. In one embodiment the gas source is a solar collector.

All of the previously defined features of the first aspect of the invention may form features of the third aspect of the invention.

In accordance with a fourth embodiment of the present invention, there is provided apparatus for storing energy, comprising a high pressure storage vessel for receiving compressed gas, the high pressure storage vessel comprising high pressure heat storage means for receiving thermal energy from compressed gas passing through the high pressure storage vessel and an outlet for discharging gas from the high pressure storage vessel; wherein the apparatus further comprises: a low pressure storage vessel comprising low pressure heat storage means for receiving thermal energy from gas, the low pressure storage vessel being selectively connectable to the high pressure storage vessel; and gas transfer means for transferring gas between the high pressure storage vessel and the low pressure storage vessel, whereby thermal energy stored by the high pressure heat storage means is transferred to the low pressure heat storage means by gas passing between the high pressure storage vessel and the low pressure storage vessel.

All of the previously defined features of the first aspect of the invention may form features of the fourth aspect of the invention.

In accordance with a fifth aspect of the present invention, there is provided apparatus for storing energy, comprising: a high pressure storage vessel for receiving high pressure gas (e.g. high pressure heated gas during a charge phase), the high pressure storage vessel comprising high pressure heat storage means comprising a first chamber housing a first gas-permeable heat storage structure; and a low pressure storage vessel for receiving low pressure gas, the low pressure storage vessel comprising low pressure heat storage means comprising a second chamber housing a second gas-permeable heat storage structure; wherein the first heat storage structure has a mean surface area per unit volume which is higher than a mean surface area per unit volume of the second heat storage structure.

Advantageously, the present applicant has identified that providing a heat storage structure with a relatively high mean surface area per unit volume (i.e. per unit volume of the heat storage structure) on the high pressure side and a relatively low mean surface area per unit volume on the low pressure side results in an improvement in charge/discharge performance. In particular, the present applicant has identified that a reduction in both irreversibility over a charge/discharge cycle and thermal front length may be achieved in the high pressure store which outweighs the increase in pressure drop experienced by gas passing through the high pressure storage vessel.

The high pressure storage vessel may be connectable to the low pressure storage vessel. In one embodiment, during a charging phase the low pressure heat storage means is configured to receive thermal energy from gas (e.g. low pressure gas received from the high pressure storage vessel). In another embodiment, during a charging phase the low pressure heat storage means is configured to transfer thermal energy to gas (e.g. to expanded low pressure gas received by the low pressure storage vessel to generate a cold store).

In one embodiment, the first heat storage structure comprises particulate material housed in the first chamber.

In one embodiment, the second heat storage structure comprises particulate material housed in the second chamber.

In one embodiment, one of the first and second heat storage structure comprises a refractory material (e.g. refractory blocks) and the other of the first and second heat storage structure comprises a metallic material.

In one embodiment, one of the first and second heat storage structure comprises a metallic material and the other of the first and second heat storage structure comprises natural mineral material (e.g. crushed mineral such as gravel).

In one embodiment, the particulate material comprises at least one of: solid particles; porous media; fibres; and foamed material (e.g. metallic, mineral or ceramic particles and/or fibres and/or foam) packed to form a gas-permeable structure.

In one embodiment, the first chamber is configured to receive gas (e.g. high pressure heated gas) from an inlet and the first heat storage structure has a region in which a mean surface area per unit volume of the first heat storage structure decreases with increased distance from the inlet (e.g. in the direction of the gas flow through the chamber). In this way, high pressure heat storage means is provided in which a first high surface area layer generates a short thermal front and supplies gas to a second comparatively low surface area layer. Advantageously, the provision of the low surface area layer following the high surface area layer (in the direction of the gas flow during charging) allows the pressure drop at the high pressure side to be reduced whilst generating a shorter thermal front for improved heat absorption and a reduced irreversibility.

In one embodiment, the region extends from a part of the first heat storage structure substantially closest to the inlet.

In one embodiment, the change in mean surface area per unit volume occurs progressively over the length of the region (e.g. steadily in substantially equal increments). In one embodiment, the change in mean surface area per unit volume in the region occurs substantially smoothly (e.g. in the case of a first heat storage structure comprising particulate material housed in the first chamber, layers of particulate matter in gradually increasing size). In another embodiment, the change in mean surface area per unit volume in the region occurs in discrete steps (e.g. in the case of a first heat storage structure comprising particulate material housed in the first chamber, with first and second layers of particulate matter of substantially different size). Each discrete step may have substantially similar length.

In the case of discrete steps, the region may define first and second sub-regions, the first sub-region having a mean surface area per unit volume which is greater than a mean surface area per unit volume of the second sub-region. In one embodiment, the first sub-region has a length which is at least 10% of the length of the heat storage structure. In another embodiment, the first sub-region has a length which is at least 20% of the length of the heat storage structure. In the case of a heat storage structure comprising particulate material housed in the chamber, at least one of the first and second regions may comprise a plurality of layers of particulate matter each layer having a different mean particle size.

In one embodiment, the region extends a long a full length of the first heat storage structure.

In another embodiment, the region extends along a part of the length of the first heat storage structure and the first heat storage structure comprises a further region having a mean surface area per unit volume which is higher than the lowest mean surface area per unit volume of the first-defined region. In this way, the first heat storage structure may be configured to generate a shorter thermal front when the flow is reversed through the high pressure heat storage means.

In one embodiment the further region has a mean surface area per unit volume which increases which increased distance from the inlet.

In one embodiment, the change in mean surface area per unit volume in the further region occurs progressively over the length of the region (e.g. steadily in substantially equal increments). In one embodiment, the change in mean surface area per unit volume in the region occurs substantially smoothly (e.g. with layers of particulate matter in gradually increasing size). In another embodiment, the change in mean surface area per unit volume in the region occurs in discrete steps (e.g. with first and second layers of particulate matter of substantially different size). Each discrete step may have substantially similar length.

In one embodiment, the further region has a mean surface area per unit volume which remains substantially constant along the length of the further region.

In one embodiment, the first chamber has an effective length-to-width ratio which is greater than an effective length-to-width ratio of the second chamber.

In one embodiment, the effective length-to-width ratio of the first chamber is at least 10% greater than the effective length-to-width ratio of the second chamber.

In one embodiment, the high pressure heat storage means has a void fraction which is lower than a void fraction of the low pressure heat storage means. Advantageously, reducing the void fraction at the high pressure side of the apparatus allows a reduction in the volume of high pressure storage vessel (thereby potentially reducing manufacturing costs) for an acceptable increase in pressure drop on the high pressure side.

In one embodiment, the high pressure heat storage means has a void fraction which is at least 5% lower than the void fraction of the low pressure heat storage means.

In one embodiment, the high pressure heat storage means has a void fraction which is at least 10% lower than the void fraction of the low pressure heat storage means.

In one embodiment, the high pressure heat storage means is configured to generate an absolute pressure drop which is twice the absolute pressure drop generated by the low pressure heat storage means.

In one embodiment, the high pressure heat storage means is configured to generate an absolute pressure drop which is three times the absolute pressure drop generated by the low pressure heat storage means.

In one embodiment, the high pressure heat storage means is configured to generate an absolute pressure drop which is five times the absolute pressure drop generated by the low pressure heat storage means.

In one embodiment, the high pressure heat storage means is configured to generate an absolute pressure drop which is ten times the absolute pressure drop generated by the low pressure heat storage means.

In one embodiment, the first heat storage structure and the second heat storage structure comprise substantially the same material or, in the case of a mixture of materials, substantially similar ratios of the same materials.

In one embodiment, the first heat storage structure and the second heat storage structure comprise different materials or different ratios of the same materials.

In one embodiment, the first heat storage structure has a mean heat capacity per unit mass which is greater than a mean heat capacity per unit mass of the second heat storage structure.

In one embodiment, the mean heat capacity per unit mass of the first heat storage structure is at least 10% greater than the mean heat capacity per unit mass of the second heat storage structure.

In one embodiment, the first heat storage structure has a mean heat capacity per unit volume which is greater than a mean heat capacity per unit volume of the second heat storage structure.

In one embodiment, the mean heat capacity per unit volume of the first heat storage structure is at least 10% greater than the mean heat capacity per unit volume of the second heat storage structure.

In one embodiment, the first heat storage structure has a mean density that is at least 10% greater than a mean density of the second heat storage structure.

In one embodiment, the first and second heat storage means each have thermal insulation.

In one embodiment, one of the first and second heat storage means has substantially all of its thermal insulation inside its respective chamber and the other of the first and second heat storage means has substantially all of its thermal insulation substantially outside its respective chamber.

In accordance with a sixth aspect of the present invention, there is provided apparatus for storing energy, comprising: a high pressure storage vessel for receiving high pressure gas (e.g. high pressure heated gas during a charge phase), the high pressure storage vessel comprising high pressure heat storage means comprising a first chamber housing a first gas-permeable heat storage structure; and a low pressure storage vessel for receiving low pressure gas, the low pressure storage vessel-comprising low pressure heat storage means comprising a second chamber housing a second gas-permeable heat storage structure; wherein the high pressure heat storage means has a void fraction which is lower than a void fraction of the low pressure heat storage means.

Advantageously, reducing the void fraction at the high pressure side of the apparatus allows a reduction in the volume of high pressure storage vessel (thereby potentially reducing manufacturing costs) for an acceptable increase in pressure drop on the high pressure side.

In one embodiment, the high pressure heat storage means has a void fraction which is at least 5% lower than the void fraction of the low pressure heat storage means.

In one embodiment, the high pressure heat storage means has a void fraction which is at least 10% lower than the void fraction of the low pressure heat storage means.

The high pressure storage vessel may be connectable to the low pressure storage vessel. In one embodiment, during a charging phase the low pressure heat storage means is configured to receive thermal energy from gas (e.g. low pressure gas received from the high pressure storage vessel). In another embodiment, during a charging phase the low pressure heat storage means is configured to transfer thermal energy to gas (e.g. to expanded low pressure gas received by the low pressure storage vessel to generate a cold store).

In one embodiment, the first heat storage structure comprises particulate material housed in the first chamber.

In one embodiment, the second heat storage structure comprises particulate material housed in the second chamber.

In one embodiment, one of the first and second heat storage structure comprises a refractory material (e.g. refractory blocks) and the other of the first and second heat storage structure comprises a metallic material.

In one embodiment, one of the first and second heat storage structure comprises a metallic material and the other of the first and second heat storage structure comprises natural mineral material (e.g. crushed mineral such as gravel).

In one embodiment, the particulate material comprises at least one of: solid particles; porous media; fibres; and foamed material (e.g. metallic, mineral or ceramic particles and/or fibres and/or foam) packed to form a gas-permeable structure.

In one embodiment, the first chamber has an effective length-to-width ratio which is greater than an effective length-to-width ratio of the second chamber.

In one embodiment, the effective length-to-width ratio of the first chamber is at least 10% greater than the effective length-to-width ratio of the second chamber.

In one embodiment, the high pressure heat storage means is configured to generate an absolute pressure drop which is twice the absolute pressure drop generated by the low pressure heat storage means.

In one embodiment, the high pressure heat storage means is configured to generate an absolute pressure drop which is three times the absolute pressure drop generated by the low pressure heat storage means.

In one embodiment, the high pressure heat storage means is configured to generate an absolute pressure drop which is five times the absolute pressure drop generated by the low pressure heat storage means.

In one embodiment, the high pressure heat storage means is configured to generate an absolute pressure drop which is ten times the absolute pressure drop generated by the low pressure heat storage means.

In one embodiment, the first heat storage structure and the second heat storage structure comprise substantially the same material or, in the case of a mixture of materials, substantially similar ratios of the same materials.

In one embodiment, the first heat storage structure and the second heat storage structure comprise different materials or different ratios of the same materials.

In one embodiment, the first heat storage structure has a mean heat capacity per unit mass which is greater than a mean heat capacity per unit mass of the second heat storage structure.

In one embodiment, the mean heat capacity per unit mass of the first heat storage structure is at least 10% greater than the mean heat capacity per unit mass of the second heat storage structure.

In one embodiment, the first heat storage structure has a mean heat capacity per unit volume which is greater than a mean heat capacity per unit volume of the second heat storage structure.

In one embodiment, the mean heat capacity per unit volume of the first heat storage structure is at least 10% greater than the mean heat capacity per unit volume of the second heat storage structure.

In one embodiment, the first heat storage structure has a mean density that is at least 10% greater than a mean density of the second heat storage structure.

In one embodiment, the first and second heat storage means each have thermal insulation.

In one embodiment, one of the first and second heat storage means has substantially all of its thermal insulation inside its respective chamber and the other of the first and second heat storage means has substantially all of its thermal insulation substantially outside its respective chamber.

In accordance with a seventh aspect of the present invention, there is provided heat storage means comprising a chamber for receiving gas (e.g. heated gas during a charge phase) from an inlet, the chamber housing a gas-permeable heat storage structure; wherein the heat storage structure has a region in which a mean surface area per unit volume of the heat storage structure decreases with increased distance from the inlet (e.g. in the direction of the gas flow through the chamber).

In one embodiment, the heat storage structure comprises particulate material housed in the chamber.

In one embodiment, the particulate material comprises at least one of: solid particles; porous media; fibres; and foamed material (e.g. metallic, mineral or ceramic particles and/or fibres and/or foam) packed to form a gas-permeable structure.

In one embodiment, the region extends from a part of the heat storage structure substantially closest to the inlet.

In one embodiment, the change in mean surface area per unit volume occurs progressively over the length of the region (e.g. steadily in substantially equal increments). In one embodiment, the change in mean surface area per unit volume in the region occurs substantially smoothly (e.g. with layers of particulate matter in gradually increasing size). In another embodiment, the change in mean surface area per unit volume in the region occurs in discrete steps (e.g. with first and second layers of particulate matter of substantially different size). Each discrete step may have substantially similar length.

In the case of discrete steps, the region may define first and second sub-regions, the first sub-region having a mean surface area per unit volume which is greater than a mean surface area per unit volume of the second sub-region. In one embodiment, the first sub-region has a length which is at least 10% of the length of the heat storage structure. In another embodiment, the first sub-region has a length which is at least 20% of the length of the heat storage structure. In the case of a heat storage structure comprising particulate material housed in the chamber, at least one of the first and second regions may comprise a plurality of layers of particulate matter each layer having a different mean particle size.

In one embodiment, the region extends a long a full length of the heat storage structure.

In another embodiment, the region extends along a part of the length of the heat storage structure and the heat storage structure comprises a further region having a mean surface area per unit volume which is higher than the lowest mean surface area per unit volume of the first-defined region.

In one embodiment, the further region has a mean surface area per unit volume which increases which increased distance from the inlet.

In one embodiment, the change in mean surface area per unit volume in the further region occurs progressively over the length of the region (e.g. steadily in substantially equal increments). In one embodiment, the change in mean surface area per unit volume in the region occurs substantially smoothly (e.g. with layers of particulate matter in gradually increasing size). In another embodiment, the change in mean surface area per unit volume in the region occurs in discrete steps (e.g. with first and second layers of particulate matter of substantially different size). Each discrete step may have substantially similar length.

In one embodiment, the further region has a mean surface area per unit volume which remains substantially constant along the length of the further region.

In one embodiment, the heat storage means is a high pressure heat storage means.

In one embodiment, the heat storage means is a low pressure heat storage means.

Embodiments of the present invention will now be described by way of example with reference to the accompanying drawings in which;

BRIEF DESCRIPTION OF THE DRAWINGS

FIG. 1 shows an electricity storage system 1 comprising a compressor/expander (e.g. compressor/expander turbine) 2 powered by electricity supply 3 and connected to high pressure thermal store 10 and gas store 20. High pressure thermal store 10 is in turn connected to low pressure thermal stores 11 and 12. Air enters and leaves the system through pipe 30 and is transferred via pipes 31, 32, 33, 34, 35, 36, 37 and 38. Valves 40, 41, 42, 43, 44 and 46 can be used to selectively close/open different pipes. Air Pump 50 is connected to pipe 36 and can pump air in either direction. Heat exchanger 60 is used to keep the temperature of the gas passing through pipe 36 at a substantially ambient or fixed base temperature.

Figure 1:
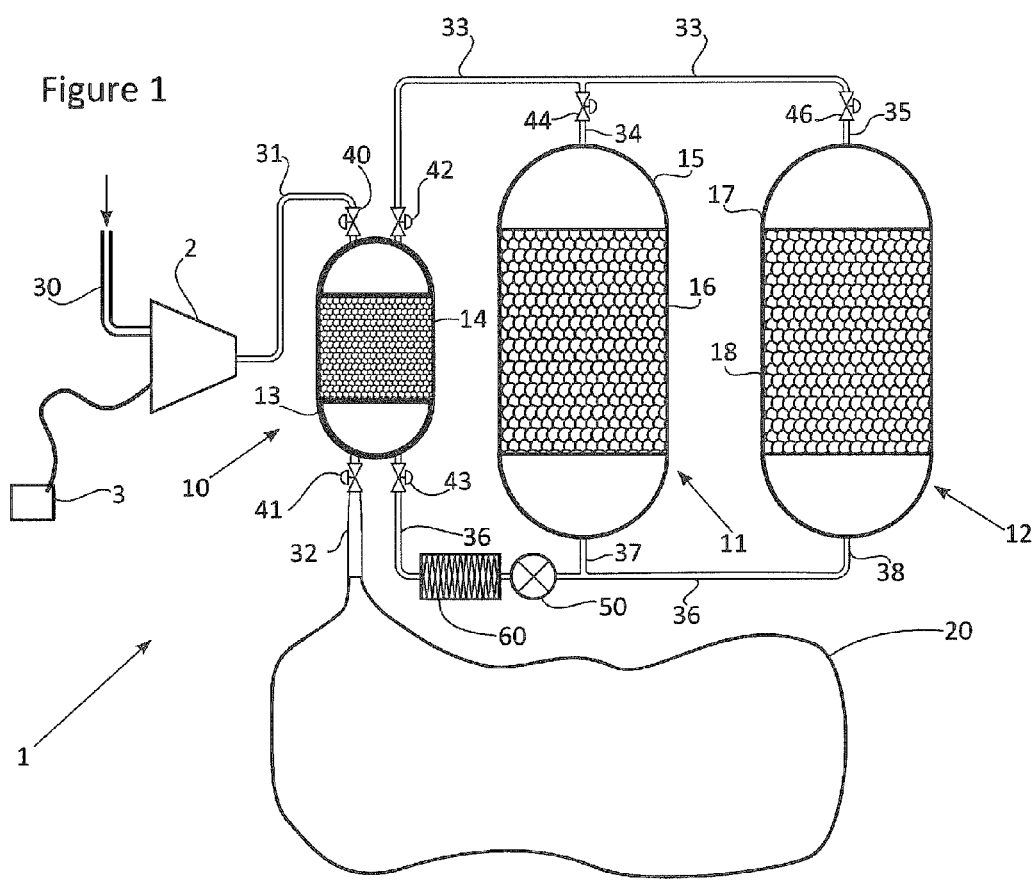
FIG. 1 shows a schematic illustration of an electricity storage system according to a first embodiment of the present invention.

The high pressure thermal store 10 comprises an insulated high pressure vessel 13 with a thermal matrix 14 that the compressed gas can pass through and transfer its heat when charging and receive its heat from when discharging.

The low pressure thermal stores 11 and 12 comprise an insulated low pressure vessel 15 and 17 with a thermal matrix 16 and 18 that the gas can pass through and transfer its heat when charging and receive its heat from when discharging.

The gas store 20 may be a pressurised underground cavern, such as a salt dome, an aquifer or other suitable underground space. Alternatively it may be a pressure vessel. It may be either a fixed volume space, a fixed pressure space or a combination of both.

The compressor/expander 2 acts as a compressor driven by an electric motor (not shown) when charging and as an expander (i.e. turbine if a rotary machine) driving a generator (not shown) when discharging. The compressor and expander may be the same equipment as shown or they may be separate units optimised for each process.

All pipes, valves and vessels that are exposed to the high pressure within the system are designed for the relevant temperature and load.

As illustrated, the high pressure vessel 13 has a storage volume which is substantially less than the storage volume of each of the low pressure vessels 15, 17.

The low pressure and high pressure heat stores may each comprise a particulate thermal storage medium that allows for a very high heat exchange area. If the material is to be used within a pressurised thermal store then it may be preferable that the material has a high volumetric heat capacity to minimise the amount of storage volume that is required, however if the high pressure store is small relative to the unpressurised store this additional cost may not be significant. It is also important that the length of the thermal front through the high pressure store is kept short relative to the length of the high pressure store. This means that a small particle size and a high conductivity are important if the store is to be frequently cycled, for example a fine copper mesh could be used. If the store is infrequently cycled then the length of the front is less significant and a larger less conductive particle size can be used, for example gravel. If an unpressurised store is used then the cost of containment drops significantly and a cheaper material with lower thermal heat capacity can provide the most cost-effective solution. In the embodiment depicted, high pressure vessel 13 includes a solid particulate thermal storage medium having a smaller mean particle size than the solid particulate thermal storage medium of the low pressure vessels 15, 17 corresponding to a higher mean surface area per unit volume.

If high temperatures are required then it is normally necessary to use manmade refractories, such as forms of alumina or magnesium oxide, or metallic components. If lower temperatures are to be used then other materials become suitable such as quartzite, magnetite, taconite or other low cost materials. The aim is to provide a low cost material that has reasonable volumetric heat capacity and can be thermally cycled.

In operation, when storing electricity during a charge phase, atmospheric air is drawn in through pipe 30 and compressed in compressor/expander 2 before entering pipe 31. Valves 40 and 41 are both open. Valves 42 and 43 are both closed. The air in pipe 31 is both higher pressure and higher temperature than when it entered the compressor/expander 2. The thermal matrix 14, 16 and 18 are initially at substantially ambient temperature.

The air enters high pressure thermal store 10 through valve 40 and passes inside high pressure vessel 13 and through thermal matrix 14. As the high pressure air enters the thermal matrix 14 it transfers its heat of compression to the thermal matrix 14. The now cooled high pressure air leaves the thermal matrix 14 and passes out of the high pressure vessel 13 via valve 41 and into pipe 32. Pipe 32 may have an additional heat exchanger fitted to further cool any air prior to entering gas store 20. The air then enters gas store 20, which volumetrically is much larger than high pressure vessel 13.

When the thermal matrix 14 has stored a sufficient quantity of the heat of compression the compressor/expander 2 is stopped. The valves 40 and 41 are both closed and the pressure within the high pressure vessel 13 is lowered to the pressure within the low pressure vessels 15 and 17 (e.g. using a balance pump (not shown) corresponding to balance pump 120 discussed below with reference to FIG. 3).

When the pressures are substantially equal, valves 42, 43 and 44 are set to an open position and valve 46 is closed. Pump 50 is activated and pumps air from pipe 36 via heat exchanger 60 through valve 43 and into the high pressure vessel 13. The air passes through the thermal matrix 14 where it receives heat from the matrix. The air passes out of the high pressure vessel and enters pipe 33 via valve 42. The air passes into pipe 34 via valve 44 and enters the low pressure vessel 15. The air passes through the thermal matrix 16 and transfers heat to the matrix. The air leaves the thermal matrix at near to ambient temperature and exits the low pressure vessel 15 via pipe 37 and enters pipe 36. The air returns to the pump 50 and the process of transferring heat from the high pressure thermal store to the low pressure thermal store continues. When a suitable proportion of the heat has been transferred pump 50 is stopped and valves 42 and 43 are closed.

Air is added to the high pressure thermal store (e.g. using a balance pump (not shown) comprising a compressor for receiving and raising the pressure of atmospheric air) until the pressure within the store is substantially equal to that within pipes 31 and 32. Valves 40 and 41 are opened and the compressor/expander 2 starts to compress air again.

The above process repeats until low pressure thermal store 11 is 'fully charged' with heat. At this stage valve 44 is closed and valve 46 is opened and low pressure thermal store 12 can now be charged in a similar manner.

When all stores are charged the system is 'full', however it is possible to recover the electricity stored at any stage, even when stores are part charged. The charge/discharge efficiency of the system will always be less than 100% as there are a number of losses in the different processes.

To 'recover' the electricity in a discharge phase, pressurised air is drawn in through pipe 32 and enters high pressure vessel 13 via valve 41. If fully charged each thermal matrix 14, 16 and 18 should be in a 'hot' state. Valves 40 and 41 are both open. Valves 42 and 43 are both closed.

The high pressure air passes through thermal matrix 14 and receives heat from the thermal matrix. The now heated air leaves the high pressure vessel 13 via valve 40 and enters pipe 31. The air enters the compressor/expander 2 and is expanded generating work in the process that drives a generator to produce electricity that is transmitted into electricity supply 3.

This process continues until the thermal matrix 14 has transferred a suitable quantity of heat i.e. it is fully discharged. In cyclic operation it may be beneficial to leave part of the thermal front in the store for reuse in a subsequent stage. The compressor/expander 2 is stopped. The valves 40 and 41 are both closed and the pressure within the high pressure vessel 13 is lowered to the pressure within the low pressure vessels 15 and 17.

When the pressures are substantially equal valves 42, 43 and 44 are set to an open position and valve 46 is closed. Pump 50 is activated and pumps air from pipe 36 into pipe 37 and enters low pressure vessel 15. The air passes through the thermal matrix 16 and receives heat from the matrix. The air passes out of the low pressure vessel 15 into pipe 34 and via valve 44 into pipe 33. The air enters the high pressure vessel 13 via valve 42. The air passes through the thermal matrix 14 and transmits heat to the matrix. The air leaves the matrix at a temperature that is near ambient or the base temperature and passes into pipe 36 via valve 43. The air passes through heat exchange 60 where it is cooled further if necessary and leaves the heat exchanger at near ambient or base temperature.

The system may operate at a base temperature that is above ambient. Losses within the system tend to accumulate as lower grade heat and this heat needs to be removed from the system to stop the overall temperature rising. Heat exchanger 60 removes this heat, but for simplicity it is easier to reject the heat if the system temperature is above ambient i.e. heat exchange design is simpler and smaller if there is a larger temperature difference. Consequently the base system temperature may be near ambient or it may be higher than ambient, for example 50 degrees C. higher.

The air returns to the pump 50 and the process of transferring heat from the low pressure thermal store to the high pressure thermal store continues. When a suitable proportion of the heat has been transferred pump 50 is stopped and valve 42 and 43 are closed.

Air is added to the high pressure thermal store until the pressure within the store is substantially equal to that within pipes 31 and 32. Valves 40 and 41 are opened and the compressor/expander 2 starts to expand air again.

This process repeats until the low pressure thermal store 11 is 'fully discharged'. At this stage valve 44 is closed and valve 46 is opened and low pressure thermal store 12 can now be discharged in a similar manner.

Figure 2:
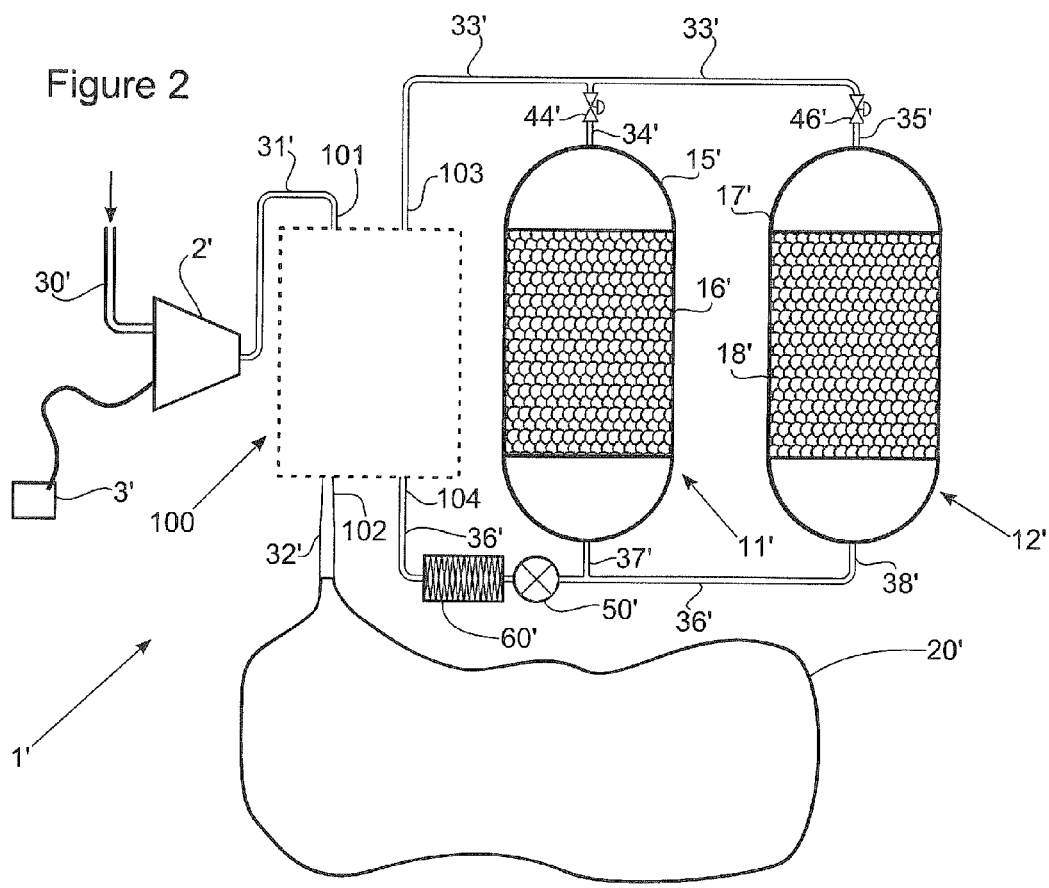
FIG. 2 shows a schematic illustration of an electricity storage system according to a second embodiment of the present invention.

FIG. 2 shows an electricity storage system 1' for allowing heat transfer to operate as a continuous process rather than as a 'batch' process system 1 shown in FIG. 1.

Electricity storage system 1' comprises a compressor/expander 2' powered by electricity supply 3' and connected to a high pressure/low pressure heat transfer system 100 and gas store 20'. High pressure/low pressure heat transfer system 100 is in turn connected to low pressure thermal stores 11' and 12' comprising insulated low pressure vessels 15' and 17' with thermal matrix 16' and 18' respectively. Air enters and leaves the system through pipe 30' and is transferred via pipes 31', 32', 33', 34', 35', 36', 37' and 38'. Valves 44' and 46' can be used to selectively close/open different pipes. Air Pump 50' is shown in pipe 36' and can pump air in either direction. Heat exchanger 60' is used to keep the temperature of the gas passing through the pipe at a substantially ambient or fixed base temperature. Pipe 32' may have an additional heat exchanger fitted (not shown) to further cool any air entering the gas store 20.

Figure 3:
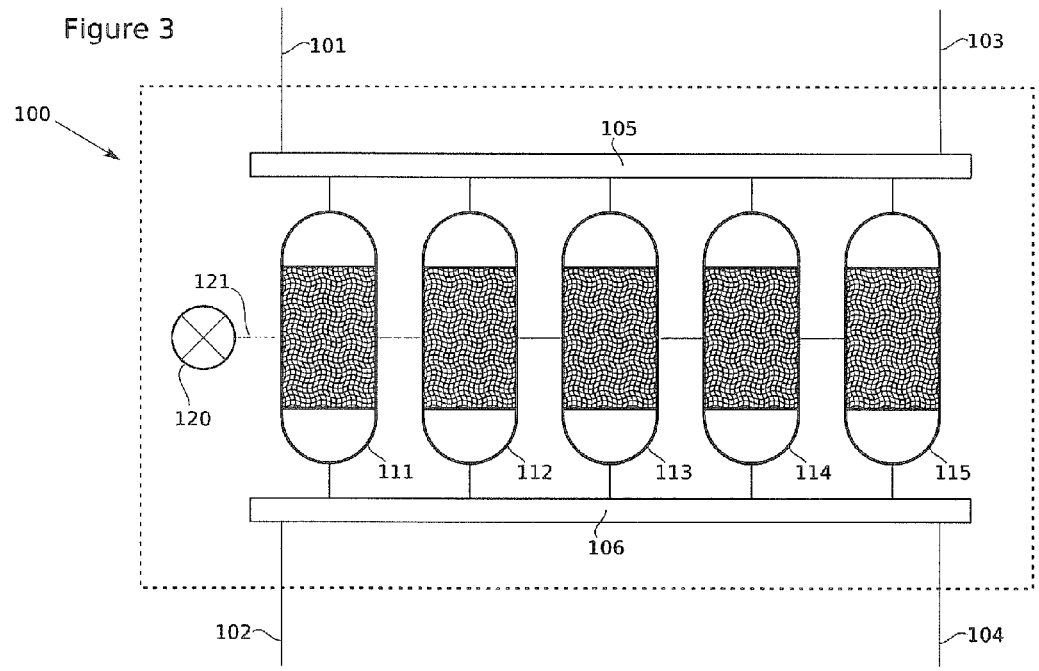
FIG. 3 shows a schematic illustration of a part of the electricity storage system of FIG. 2.

Heat Transfer system 100, shown in detail in FIG. 3, comprises high pressure thermal stores 111, 112, 113, 114 and 115 connected to selective valve 105 and 106. The system also includes high pressure input/output devices 101 and 102 and low pressure input/output devices 103 and 104. As illustrated, high pressure stores 111, 112, 113, 114 and 115 all include solid particulate thermal storage medium having a smaller mean particle size than the solid particulate thermal storage medium of the low pressure vessels 15', 17' corresponding to a higher mean surface area per unit volume.

In operation, at start up, thermal stores 111-112 are at near ambient temperature and high pressure, thermal stores 113-115 are at near ambient temperature and low pressure. Hot high pressure gas enters the system 100 via high pressure input/output device 101 and is directed via selective valve 105 into thermal store 111 and the now cooled high pressure gas leaves thermal store 111 via selective valve 106 and exits the system via high pressure input/output device 102.

When thermal store 111 is fully charged with 'heat', the hot high pressure input flow is switched via selective valves 105 and 106 such that the flow now passes through thermal store 112. The balance pump 120 lowers the pressure in thermal store 111 to the low pressure and raises the pressure in thermal store 113 to the high pressure via connecting pipe 121. Balance pump 120 may comprise a compressor that takes atmospheric air and raises the pressure in the thermal store as required. The drop in pressure can be achieved by the balance pump 120 using an expansion valve. The energy within the pressurised air is low when compared to the thermal energy within the store, so it is not essential to recover this. However, if it is to be recovered, then this can be achieved by the use of an expander connected to a generator if stand alone, or if the expander is linked to a compressor, then the energy of the expanding air can be used to help drive a compressor to raise the pressure in a different thermal store. This will result in the lowest energy loss for lowering and raising the pressure within the thermal stores. The balance pump 120 should be regarded as a device that lowers and raises pressure as required in the thermal stores and also uses additional atmospheric air or discharges to the atmosphere as required to maintain the correct pressures within the stores. The device will need to be powered as there is likely to be a net input of work to carry out this process, although this work input is very low in term of the overall system work.

Because the thermal mass in the thermal stores is far higher than the heat capacity of the gas, these pressure changes within the stores are substantially isothermal.

When thermal store 112 is fully charged with heat, the hot high pressure input flow is switched via selective valves 105 and 106 such that the flow now passes through thermal store 113. The balance pump 120 lowers the pressure in thermal store 112 to the low pressure and raises the pressure in thermal store 114 to the high pressure via connecting pipe 121. Thermal store 111 is discharged as follows. Near ambient temperature low pressure gas enters via low pressure input/output device 104 and via selective valve 106 enters thermal store 111 where the gas is heated as it passes through the store. The gas exits the thermal store via selective valve 105 and leaves the system as hot low pressure gas through low pressure input/output device 103.

The mass flow rate through thermal store 111 is approximately half of that through thermal store 113.

Figure 4:
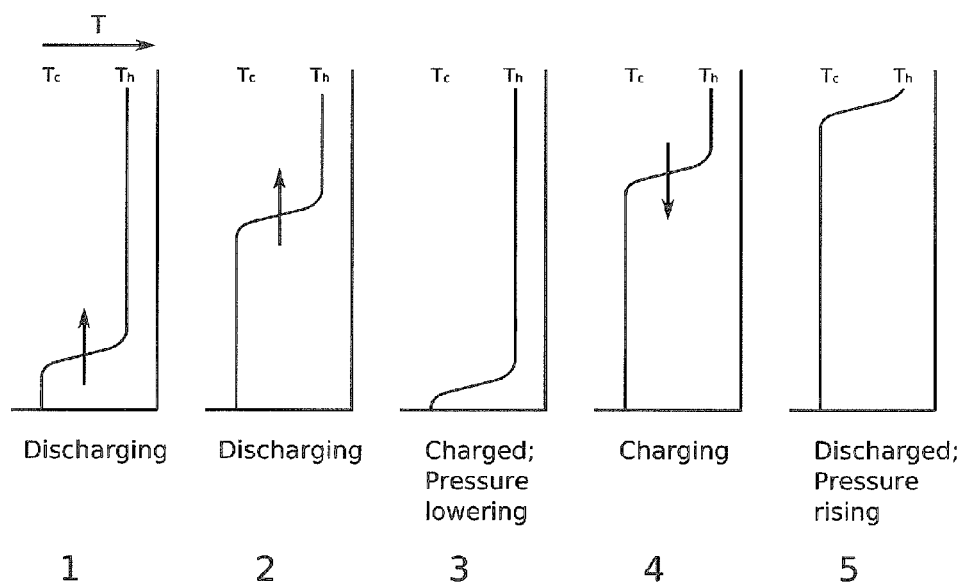
FIG. 4 illustrates the states of thermal fronts of the different high pressure stores of the electricity storage system of FIG. 2 during a point in the charging process.

When thermal store 113 is fully charged with heat, the hot high pressure input flow is switched via selective valves 105 and 106 such that the flow now passes through thermal store 114. The balance pump 120 lowers the pressure in thermal store 113 to the low pressure and raises the pressure in thermal store 115 to the high pressure via connecting pipe 121. Thermal store 111 continues to be discharged and thermal store 112 is discharged as follows. Near ambient temperature low pressure gas enters via low pressure input/output device 104 and via selective valve 106 enters thermal store 112 where the gas is heated as it passes through the store. The gas exits the thermal store 112 via selective valve 105 and leaves the system as hot low pressure gas through low pressure input/output device 103. The mass flow rate through thermal stores 111 and 112 is approximately equal to that through thermal store 114 such that the thermal flows into and out of the system are balanced. FIG. 4 shows the temperature profiles of the different stores during this stage.

In this way, one thermal store is always being charged from the high pressure gas, one store is having its pressure reduced to that of the low pressure side, two stores are being discharged into the low pressure side, and lastly one store is having the pressure raised from the low pressure to the high pressure.

There is likely to be a pressure drop from the gas flow through the thermal stores. This pressure drop on the high pressure side is likely to be low relative to the flow rates, but for the low pressure side this pressure drop can be quite significant. To reduce this it is necessary to reduce the rate at which the stores are discharged, which will lead to an imbalance in the system unless additional thermal stores are added. By having additional thermal stores it is possible to discharge, for example, two of the stores on the low pressure side at half of the mass flow rate of the high pressure side and keep the system in balance. The larger the pressure difference between high and low pressure the more significant this difference is likely to be. However, if the pressure drop is not considered significant when the low pressure gas passes through the thermal stores, then the simplest system will have just four stores with the high pressure and low pressure being charged/discharged at equal rates.

The uncharged thermal stores will normally be kept at a base temperature, this would normally be around or near to ambient, however there are some applications where it may be preferable to have a base temperature that is not ambient.

To return the heat to the system the process and flows are all reversed such that hot low pressure gas enters the system via low pressure input/output device 103 and leaves the system via high pressure input/output device 101.

FIG. 4 shows the states of the thermal fronts of the different stores in FIG. 3 during a section of the charging process:

Graph 1 shows the thermal store in a low pressure state being discharged

Graph 2 shows the thermal store in a low pressure state being discharged

Graph 3 shows the thermal store in a fully charged state with the pressure being lowered from the high pressure state to a low pressure state Graph 4 shows the thermal store in a high pressure state being charged Graph 5 shows the thermal store in a fully discharged state with the pressure being raised from the low pressure state to a high pressure state.

Figure 5:
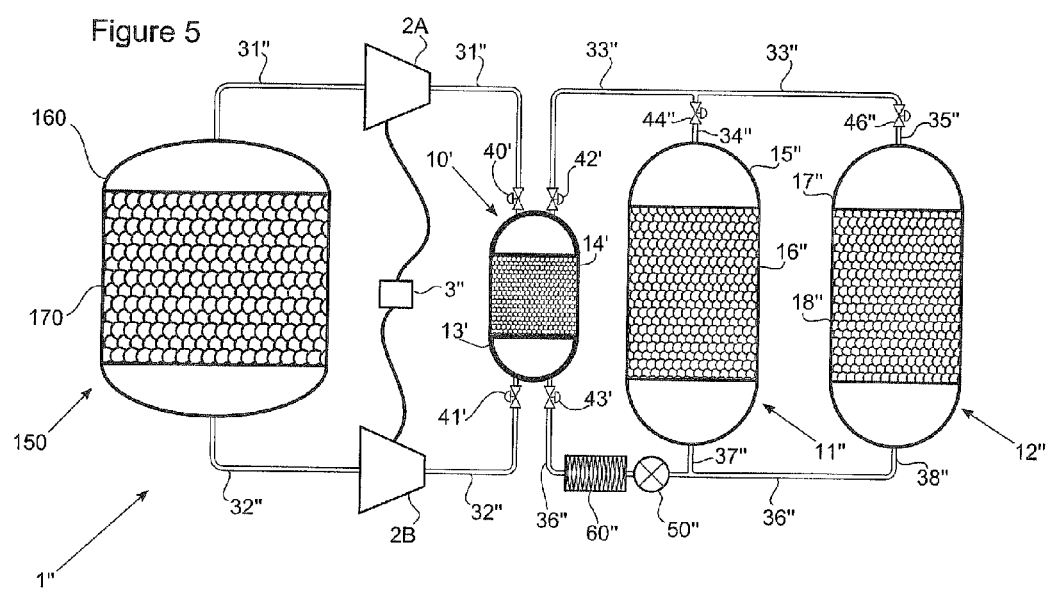
FIG. 5 shows a schematic illustration of an electricity storage system according to a third embodiment of the present invention.

FIG. 5 shows a closed cycle electricity storage system 1" comprising a compressor/expander pair 2A and 2B powered by electricity supply 3" and connected to high pressure thermal store 10' and a cold store 150. High pressure thermal store 10' is in turn connected to low pressure thermal stores 11" and 12". A gas (which could be air, argon, nitrogen or some other suitable working fluid) is transferred through the apparatus 1" via pipes 31", 32", 33", 34", 35", 36", 37" and 38". Valves 40', 41', 42', 43', 44" and 46" can be used to selectively close/open different pipes. Gas Pump 50" is shown in pipe 36" and can pump gas in either direction. Heat exchanger 60" is used to keep the temperature of the gas passing through the pipe at a substantially ambient or fixed base temperature. Pipe 31" and 32" may have additional heat exchangers fitted (not shown) to further cool or heat any gas in the pipe towards the same datum temperature, which may be near ambient. Alternatively the datum temperatures may be different for each heat exchanger.

The high pressure thermal store 10' comprises an insulated high pressure vessel 13' with a thermal matrix 14' that the compressed gas can pass through and transfer its heat when charging and receive its heat from when discharging.

The low pressure thermal stores 11" and 12" each comprise an insulated low pressure vessel 15" and 17" with a thermal matrix 16" and 18" that the gas can pass through and transfer its heat when charging and receive its heat from when discharging.

Cold store 150 comprises an insulated low pressure vessel 160 with a thermal matrix 170 configured to transfer heat to cooled, expanded gas passing through the cold store 150. In this way, energy storage apparatus 1" is provided in which the high pressure thermal store 10' and cold store 150 are placed within a thermal heat pump cycle to produce a hot and cold store respectively during charging. Energy is then recoverable in a discharging mode by passing gas through the cooled cold store 150, compressing gas cooled by the cold store 150 using compressor/expander 2B, heating the cooled compressed gas by exposing the gas to thermal matrix 14' after thermal energy has been transferred from the low pressure thermal stores 11" and 12" to thermal matrix 14' by passing low pressure gas between the high pressure thermal store 10' and low pressure thermal stores 11" and 12", and allowing the heated gas to expand by doing work on compressor/expander 2A.

As illustrated, high pressure vessel 13' includes a solid particulate thermal storage medium having a smaller mean particle size than the solid particulate thermal storage medium of the low pressure vessels 15", 17" and thermal matrix 170 corresponding to a higher mean surface area per unit volume.

Figure 6:
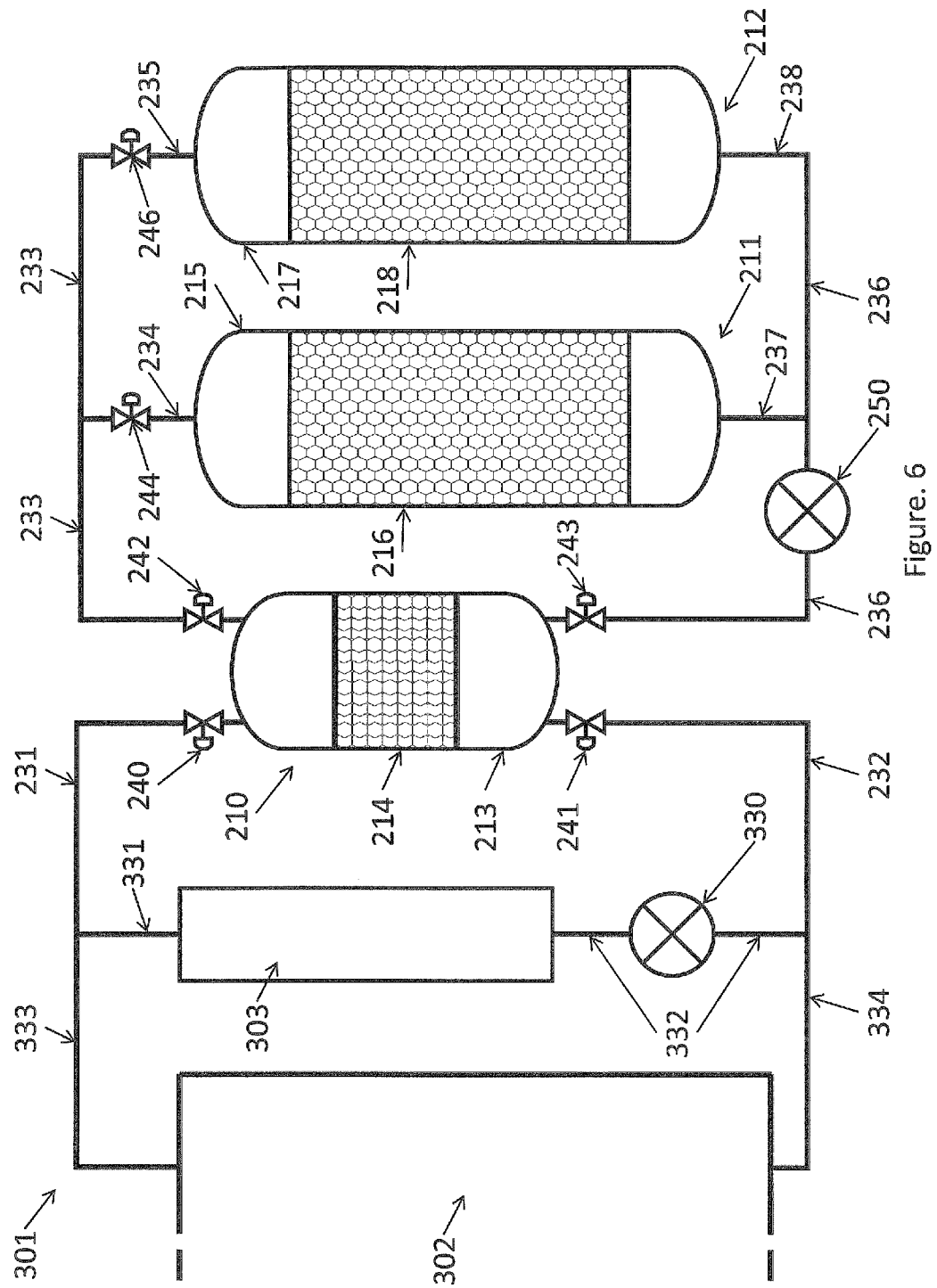
FIG. 6 shows a schematic illustration of part of a solar electricity generation system according to one embodiment of the present invention.

FIG. 6 shows a solar electricity generation system 301 comprising a heat engine 302 powered by solar collector 303 and connected to high pressure thermal store 210. Heat engine 302 will incorporate a heat rejection system and a work output system, such as a generator attached to an expander (e.g. turbine), that are not shown. High pressure thermal store 210 is in turn connected to low pressure thermal stores 211 and 212. A gas (which could be air, argon, nitrogen or some other suitable working fluid) is transferred through the apparatus 301 via pipes 231, 232, 233, 234, 235, 236', 237, 238, 331, 332, 333 and 334. Valves 240, 241, 242, 243, 244 and 246 can be used to selectively close/open different pipes. Gas Pump 250 is shown in pipe 236 and can pump the gas in either direction. Gas Pump 330 is shown in pipe 332 and can pump the gas through solar collector 303 only. The solar collector may be a concentrating collector such as a trough, tower, dish or Fresnel collector.

In generation operation hot high pressure gas enters pipe 333 from either pipe 331 or pipe 231 and passes into heat engine 302. Gas is preferably first drawn from pipe 331 which comes from solar collector 303 in preference to the gas in pipe 231 that comes from the thermal store 210. Heat engine 302 takes this hot high pressure gas and uses it to power the heat engine, the gas is then returned to pipe 334 at a similar pressure, but a lower temperature. Within the heat engine the heat can be transferred to the heat engine cycle either by a heat exchanger passing heat to the working fluid of the heat engine or by the heat engine using the gas directly as the working fluid. If the heat engine is using the gas directly as the working fluid then it is important to match the circuit pressures with the heat engine cycle. The heat engine incorporates a pumping mechanism (not shown) such that it can move gas around the circuit.

The high pressure lower temperature gas is then returned through either the solar collector 303, the high pressure thermal store 210 or a combination of both. If there is no sun or bad weather conditions such that the solar collector is only working at part or no power then the additional heat is provided from the hot thermal stores. High pressure thermal store 210 is cycled to transfer this heat from the low pressure thermal stores 211 and 212 as has been previously described.

In non-generation operation where the solar collector is working but the heat engine 302 is not then there is no gas flowing in pipes 333 and 334 and high pressure gas enters the solar collector 303 via pipe 332, being pumped by gas pump 330. In solar collector 303 the temperature of the gas is raised and it exits via pipe 331 at a similar pressure, but a higher temperature. The gas travels through pipe 231 and enters high pressure thermal store 210 via valve 240. High pressure thermal store 210 is cycled to transfer this heat to low pressure thermal stores 211 and 212 as has been previously described.

In partial-generation mode (where the heat engine is running at part load) if hot gas in excess of that required is being generated by the solar collector 303, then the gas leaving the collector in pipe 331 will pass into both pipe 333 to supply the heat engine and pipe 231 to replenish the high pressure thermal stores 210. In this way any heat generated in the solar collector 303 is preferably always used in the heat engine 302 first and only stored in the thermal store 210 as the second option. The thermal store is there to ensure that the heat engine can operate upon demand. The high pressure thermal store 210 is cycled to transfer this heat to the low pressure thermal stores 211 and 212 as has been previously described.

The high pressure thermal store 210 comprises an insulated high pressure vessel 213 with a thermal matrix 214 that the compressed gas can pass through and transfer its heat when charging and receive its heat from when discharging.

The low pressure thermal stores 211 and 212 each comprise an insulated low pressure vessel 215 and 217 with a thermal matrix 216 and 218 that the gas can pass through and transfer its heat when charging and receive its heat from when discharging.

It should be noted that only one high pressure thermal store 210 is shown on the figure so it must operate in a cyclical manner. However, if multiple high pressure thermal stores are used (as in the system of FIG. 2) then it is possible to run the system as a continuous process so, for example, one store is always charging, one store is always discharging, one store is having the pressure lowered and one store is having the pressure raised. Likewise, there can be multiple low pressure thermal stores.

The advantage of this system is that the collector circuit can be highly pressurised (for example 60 bar) such that the pumping losses are very low and the mass flow rate high for a given cross sectional area. The use of a gas as a working fluid avoids the problems associated with thermal oils (where the maximum temperature is approximately 400 deg C.) and molten salts (where they solidify if allowed to cool below a temperature around 230 deg C. depending upon the actual mixture). The collector circuit can even be tied in directly with the heat engine circuit, which means that the heat exchange into the hot side of the engine is effectively the solar collector. This improves efficiency and eliminates the need for a secondary heat exchanger. To store large quantities of heat in a pressure vessel at high pressure is uneconomic, so excess heat can be stored in lower cost thermal stores and then returned to the high pressure system when required.

Figure 7:
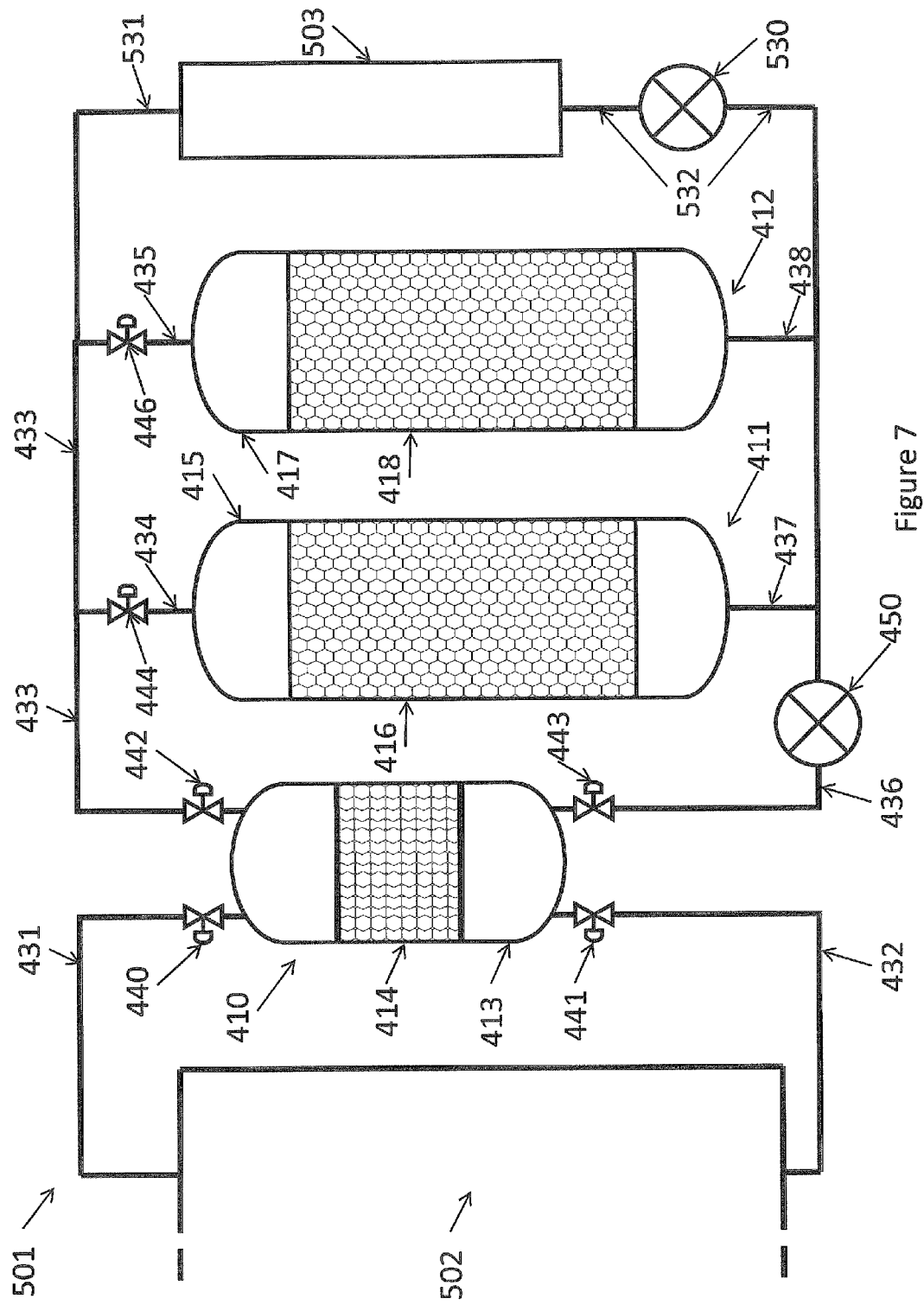
FIG. 7 shows a schematic illustration of part of a solar electricity generation system according to another embodiment of the present invention.

FIG. 7 shows a solar electricity generation system 501 comprising a heat engine 502 powered indirectly by solar collector 503 via the high pressure thermal store 410. Heat engine 502 will incorporate a heat rejection system and a work output system, such as a generator attached to an expander (e.g. turbine), that are not shown. High pressure thermal store 410 is in turn also connected to low pressure thermal stores 411 and 412 and solar collector 503. A gas (which could be air, argon, nitrogen or some other suitable working fluid) is transferred through the apparatus 501 via pipes 431, 432, 433, 434, 435, 436, 437, 438, 531 and 532. Valves 440, 441, 442, 443, 444 and 446 can be used to selectively close/open different pipes. Gas Pump 450 is shown in pipe 436 and can pump the gas in either direction. Gas Pump 550 is shown in pipe 532 and can pump the gas through the solar collector 503 only. The solar collector may be a concentrating collector such as a trough, tower, dish or Fresnel collector.

In generation operation hot high pressure gas enters pipe 431 from high pressure thermal store 410 and passes into heat engine 502. High pressure gas at a similar pressure but a lower temperature exits the heat engine and returns to the high pressure thermal store 410 via pipe 432. Within the heat engine the heat can be transferred to the heat engine cycle in the heat engine either by a heat exchanger or by the heat engine using the gas directly as the working fluid. If the heat engine is using the gas as the working fluid then it is again important to match the circuit pressures with the heat engine cycle. The heat engine incorporates a pumping mechanism (not shown) such that it can move gas around the circuit. After a certain period high pressure thermal store 410 is recharged with high temperature gas from the low pressure circuit. Gas is preferably first drawn from pipe 531 which comes directly from solar collector 503 in preference to gas from either of the low pressure thermal stores 411 or 412. As long as there is sufficient heat within the stores and/or the solar collector is collecting enough heat then the heat engine can be kept generating electricity.

When the thermal store 410 is being recharged lower temperature low pressure gas leaves the thermal store and enters either the low pressure thermal stores 411 and 412 or solar collector 503. It is preferable that gas flows through the collector in preference to flowing through the thermal stores. The flow rate through the solar collector is dependent upon the amount of solar insolation falling on it and consequently it is likely this flow rate will vary with the external conditions.

In non-generation operation there is no gas flowing in pipes 431 and 432. Instead low pressure gas enters the solar collector 503 via pipe 532, being pumped by gas pump 550.

In solar collector 503 the temperature of the gas is raised and it exits via pipe 531 at a similar pressure to that which it entered at, but at a higher temperature. The gas travels through pipe 531 and enters either low pressure thermal store 511 or 512.

In partial-generation mode (where the heat engine is running at part load) if hot gas in excess of that required is being generated by the solar collector 503, then the gas leaving the collector in pipe 531 will pass periodically into high pressure thermal store 410 to supply the heat engine 502 and pipe 434 and/or 435 to replenish the low pressure thermal stores 411 and 412. In this way any heat generated in the solar collector 503 is always transferred to the heat engine 502 first via high pressure thermal store 410 and only stored in the low pressure thermal stores 411 and 412 as the second option. The thermal stores are there to ensure that the heat engine can operate upon demand.

The high pressure thermal store 410 comprises an insulated high pressure vessel 413 with a thermal matrix 414 that the compressed gas can pass through and transfer its heat when charging and receive its heat from when discharging.

The low pressure thermal stores 411 and 412 each comprise an insulated low pressure vessel 415 and 417 with a thermal matrix 416 and 418 that the gas can pass through and transfer its heat when charging and receive its heat from when discharging.

It should be noted that only one high pressure thermal store 410 is shown on the figure so it must operate in a cyclical manner. However, if multiple high pressure thermal stores are used then it is possible to run the system as a continuous process so, for example, one store is always charging, one store is always discharging, one store is having the pressure lowered and one store is having the pressure raised. Likewise, there can be multiple low pressure thermal stores.

The advantage of this system is that the collector circuit can be at low pressure and potentially ambient pressure, which reduces issues from leakage. Pumping losses will be higher and the cross-sectional area of the collector will need to increase for a give mass flow rate of gas. However the heat can be fed directly into the low pressure thermal stores as a continuous process, with heat being 'withdrawn' and transferred to the high pressure circuit as required by the heat engine. The benefits of using a gas as the working fluid have been covered previously as well as the benefits of low pressure thermal stores.

Figure 8:
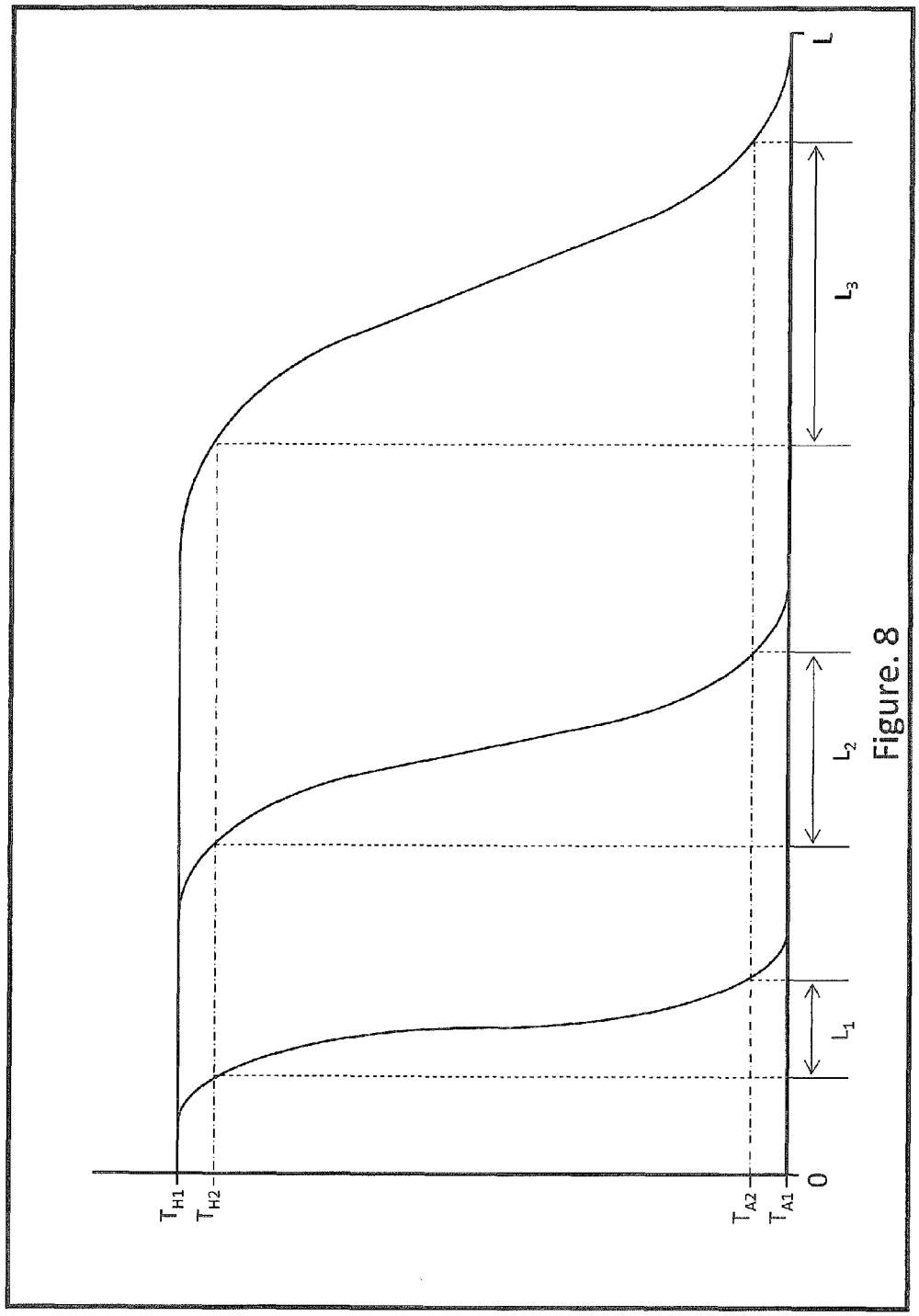
FIG. 8 illustrates the formation of a thermal front in a thermal store.

With reference to FIG. 8, any irreversible processes reduce the quality of the energy stored i.e. the 'availability' of the energy stored is reduced and this will lead to lower overall efficiencies.

Heat transfer and consequently the size of these losses is a function of a number of different variables that include particle shape and size, conductivity and density. The specific surface area per unit volume of solid is an important parameter and it is referred to as the 'specific surface'. In the case of heat transfer, a high specific surface will give better heat transfer. Smaller particles with the same geometry will have a higher specific surface.

The gas flow through the store is effectively a flow through a 'packed bed' of particles in a vessel. The fluid flow rate through the store is Q and the store cross-sectional area is A. Thus the superficial (or empty tube) velocity $U_0$ is the total flow rate divided by the cross sectional area. The existence of the particles within the store will reduce the area available for fluid flow; i.e. to preserve fluid continuity with the entering superficial flow the fluid will have to squeeze through a smaller area; hence the velocity within the volume of storage media/particles (U=interstitial velocity) will be greater than the superficial velocity $U_0$.

In flow calculations it is the solid volume fraction that is important not the mass fraction (this is not the case for heat transfer calculations). The solid volume fraction is defined as the volume of solid divided by the total volume, likewise the void fraction is the volume of voids divided by the total volume. The sum of the solid volume fraction and the void fraction should be 1.

The void fraction is usually an isotropic property (i.e. the same in all directions); hence the interstitial velocity is simply related to the superficial velocity by the following expression, which comes from a consideration of fluid continuity $$U=U_0/\text{void fraction}$$

The resistance to fluid flow increases with a decrease in the void fraction and gives rise to a pressure drop in the fluid (dP). Pressure is not a vector quantity, but a pressure gradient may be defined with respect to distance. In the case of a thermal store there is a certain pressure drop dP over a store of length L, which in this case means the pressure gradient is dP/L. The pressure decreases in the direction of the fluid velocity so the gas pressure will be lower after the gas has passed through the store.

The void fraction (or porosity) of a store will depend upon the shape of the particles and how they have been packed. A bed of spheres with a simple cubic packing will have a void fraction of approximately 50%, if the are in a close packed hexagonal structure it is nearer 25%. Randomly packed spheres have a void fraction in the range 40-50%. A material like gravel will have a void fraction of around 36-37%, but with a range of 35-40%. However, with careful packing and different sized particles the void fraction can be reduced to nearer 25%, but this takes some care. However, smaller void fractions lead to higher pressure losses.

The cost of the stores is strongly related to the pressure of the store. The higher the pressure the greater the quantity of material (such as steel) required to contain it. For a certain volume of pressure vessel if you double the pressure you double the cost of the steel required to contain it.

It is therefore advantageous to minimise the void fraction in the high pressure store. In this way the volume of the hot thermal store means is minimised at the expense of an increase in pressure loss, but the overall cost is reduced. As has been mentioned the fractional pressure drop in the store is the important measure and while the pressure is high this fractional drop can be kept low. In the cold thermal store the cost of the store is less important and the pressure loss more important, so the void fraction can be higher. In this way the system can be improved by having a high pressure store with a low void fraction combined with a lower pressure store and a higher void fraction.

In these thermal stores the aim is to reduce the level of generation of irreversibility that creates losses that in turn reduce the amount of energy that can be extracted from the stores. This irreversibility can be measured by looking at the amount of work required to generate the heat by an ideal heat pump and then looking at the amount of work that an ideal heat engine could generate from the gas that comes out of the thermal stores.

An ideal heat engine takes heat from a hot source, performs an internal process and rejects a lesser quantity of heat to a cold sink. The work output is then the difference between the heat taken from the hot source and that rejected to the cold sink. Since the quantity of thermal energy delivered and rejected is directly proportional to the temperature of delivery and rejection the well known Carnot relationship may be directly derived from this simple model. "Heat" and "temperature" are not the same, ie, they are used in their thermodynamic sense, "heat" refers too a quantity of thermal energy "temperature" is the temperature at which that thermal energy is processed.

$$\text{Heat supplied from the hot source} = k\text{Th}$$

$$\text{Heat rejected to cold sink} = k\text{Tc}$$

$$\text{Cycle work output} = k(\text{Th} - \text{Tc})$$

$$\text{Ideal cycle efficiency} = \frac{\text{Work Output}}{\text{Work Input}}$$

$$= \frac{(\text{Th} - \text{Tc})}{\text{Th}}$$

$$= \frac{1 - \text{Tc}}{\text{Th}}$$

A perfect heat pump is simply the inverse of a heat engine in that mechanical work is used to draw heat from a cold source, perform an internal process and deliver the heat to a hot reservoir:

$$\text{Heat delivered to hot reservoir} = k\text{Th}$$

$$\text{Heat drawn from cold source} = k\text{Tc}$$

$$\text{Cycle work input} = k(\text{Th} - \text{Tc})$$

$$\text{Ideal coefficient of performance} = \frac{\text{Heat Output}}{\text{Heat Input}}$$

$$= \frac{\text{Th}}{(\text{Th} - \text{Tc})}$$

By way of example: a heat pump where Th is 773 degrees Kelvin (500 deg C.) and Tc is 293 degrees Kelvin (20 deg C.) has an Ideal COP of 1.61 i.e. for each kWh of energy supplied the heat engine will supply 1.61 kWh of heat at 500 deg C.

If the return temperature is now reduced by 25 degrees Kelvin because of thermal losses within the stores, then a heat engine where Th is 748 degrees Kelvin (475 deg C.) and Tc is 293 degrees Kelvin (20 deg C.) has an ideal cycle efficiency of 60.8%, so 1.61 kWh of heat at 475 deg C. will generate 0.98 kWh of energy when run through the ideal heat engine.

In this ideal example there has been a loss of 0.02 kWh on an input of 1 kWh of energy, i.e. an overall loss in efficiency is 2%. Note in this situation both engine and heat pump are ideal and the loss is simply because the return temperature is lower.

In a heat storage situation this loss is due to the temperature difference necessary for heat exchange. This temperature difference creates irreversible thermal mixing that lowers the return temperature that can be achieved and contributes to a loss of available energy. In this mixing scenario no heat has been lost, but the temperature at which the is delivered heat has been reduced.

The difference between the two numbers is the 'thermal loss' that the stores have created. This should be distinguished from a simple loss to the environment through the insulated walls of the store. This loss is created because there must be a temperature difference between the gas and the particle, so the particles are always slightly cooler than the gas. When the gas is blown back in the reverse direction the gas must now be cooler than the particle and hence the gas comes out at a lower temperature. This level or irreversibility can be reduced by reducing the particle size, but this smaller particle size also leads to a higher pressure drop through the store.

It is also important to minimise the length of the thermal front in the stores as a shallow thermal front means that the utilisation of the store drops and the effective energy density also drops. This store utilisation can also be improved by reducing the particles size. But this smaller particle size again leads to a higher pressure drop.

However, it is the fractional pressure drop that has the real effect on efficiency. For example a loss of pressure of 0.1 bar through a storage media at 12 bar is not that significant as the fractional pressure loss is less than 1%. However if the same store were at one bar then the fractional pressure loss would be 10%, which is clearly more significant.

As illustrated in FIG. 8, this process of charging a thermal store sets up a thermal front within the store that is initially quite 'steep' but which becomes progressively shallower as charging continues.

In this example the hot gas enters at Th1 and the store is initially at Ta1 Kelvin—the length of the front would cover all of the storage media that is below Th2 Kelvin and above Ta2 Kelvin.

A steep front is where the length of the thermal front relative to the length of the thermal store is low. A shallow front is where the length of the thermal front relative to the length of the thermal store is high.

It can be seen that L1<L2<L3 so that the front is getting progressively longer and with a shallower gradient as it is charged from the initial 'steep' slope of L1.

Figure 9A:
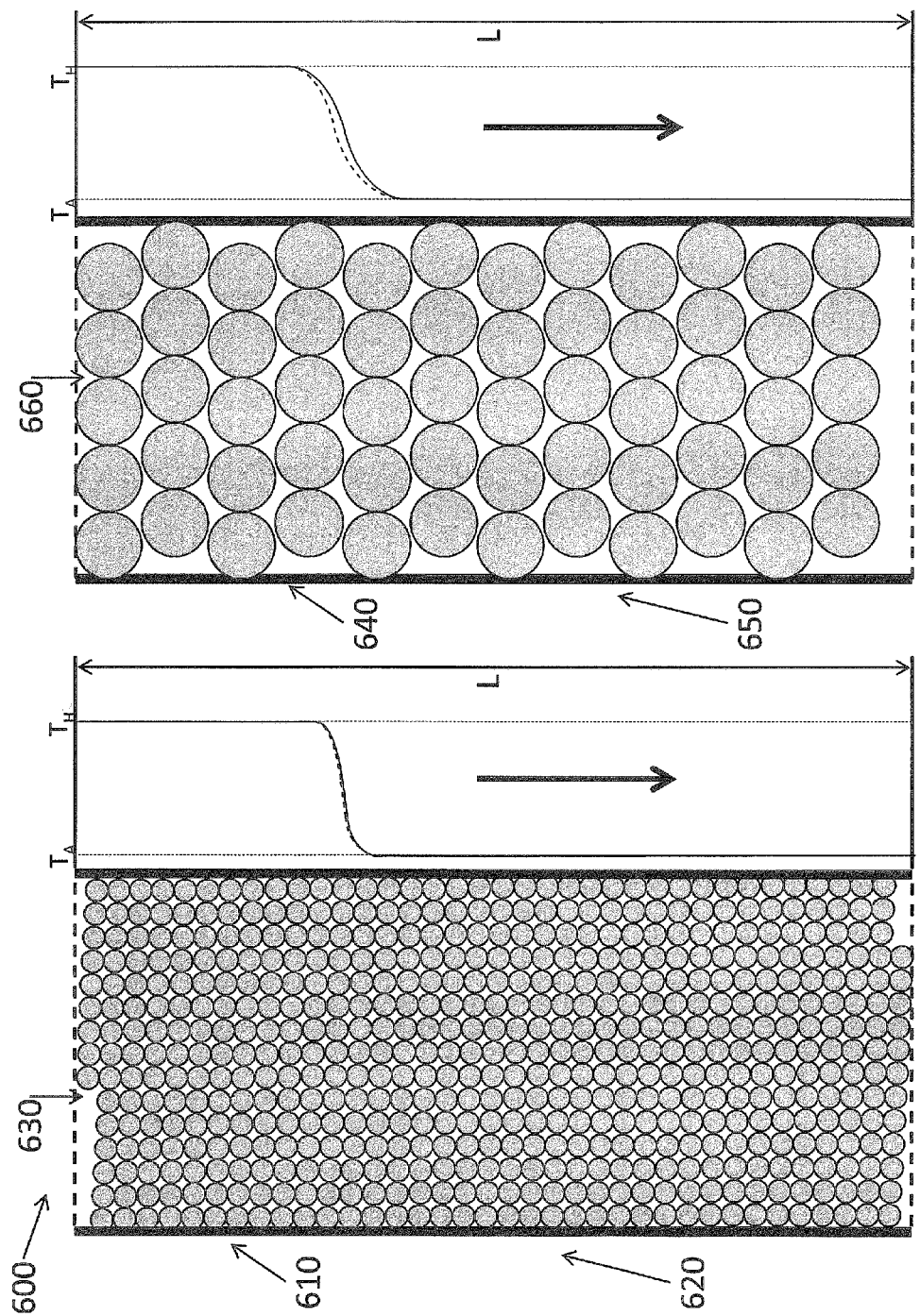
FIG. 9a shows a schematic illustration of an electricity storage system according to a further embodiment of the present invention during a charging phase.

FIG. 9a shows a cross section through heat storage apparatus 600 comprising a high pressure vessel 610 and a low pressure thermal vessel 640 connectable thereto. Heat storage apparatus 600 may form the heat storage part of any of the systems of FIGS. 1-6 previously described. It is assumed that all vessels are insulated where appropriate with suitable insulation materials.

High pressure thermal store 610 comprises a high pressure heat store 620 comprising closely packed particulate matter 630. Low pressure thermal store 640 comprises a low pressure heat store 650 comprising closely packed particulate matter 660 having a larger mean particle size (e.g. larger mean equivalent diameter) than particulate matter 630. The internal cross-sectional area of each heat vessel 610, 650 store is A and so the volume V of a length of store L is $$V=L \times A$$

If the mean size of the particles in high pressure store 610 is approx 10 times the volume of those in low pressure store 640 then for a given length L there will be 10 times as many particles in store 610. It should be noted that if the particle shape is similar the void fraction may be substantially the same for both stores.

The main difference is that the smaller particles create a higher surface area for heat transfer per unit volume of material and that the temperature gradient within the particle is also reduced by virtue of their decreased cross-sectional dimensions. This is advantageous as it means that the length of the 'thermal front' is reduced and the thermal charge/discharge efficiency of the stores is increased.

This can be seen in the graph next to each store. The stores start at ambient temperature Ta and are being charged by gas at Th such that a thermal front has developed and is moving through the stores in the direction of the arrow. The solid line represents the temperature of the gas and the dotted line the average temperature of the solid particles. It can be seen that the temperature of the solid lags behind the gas and that for larger particles the difference between the temperature of the gas and the particle is greater. This leads to an increase in 'irreversibility' and a greater thermal loss within the stores from this thermal mixing effect. The disadvantage of a smaller particle is that the pressure drop per unit length of store L increases as the particle size reduces.

Figure 9B:
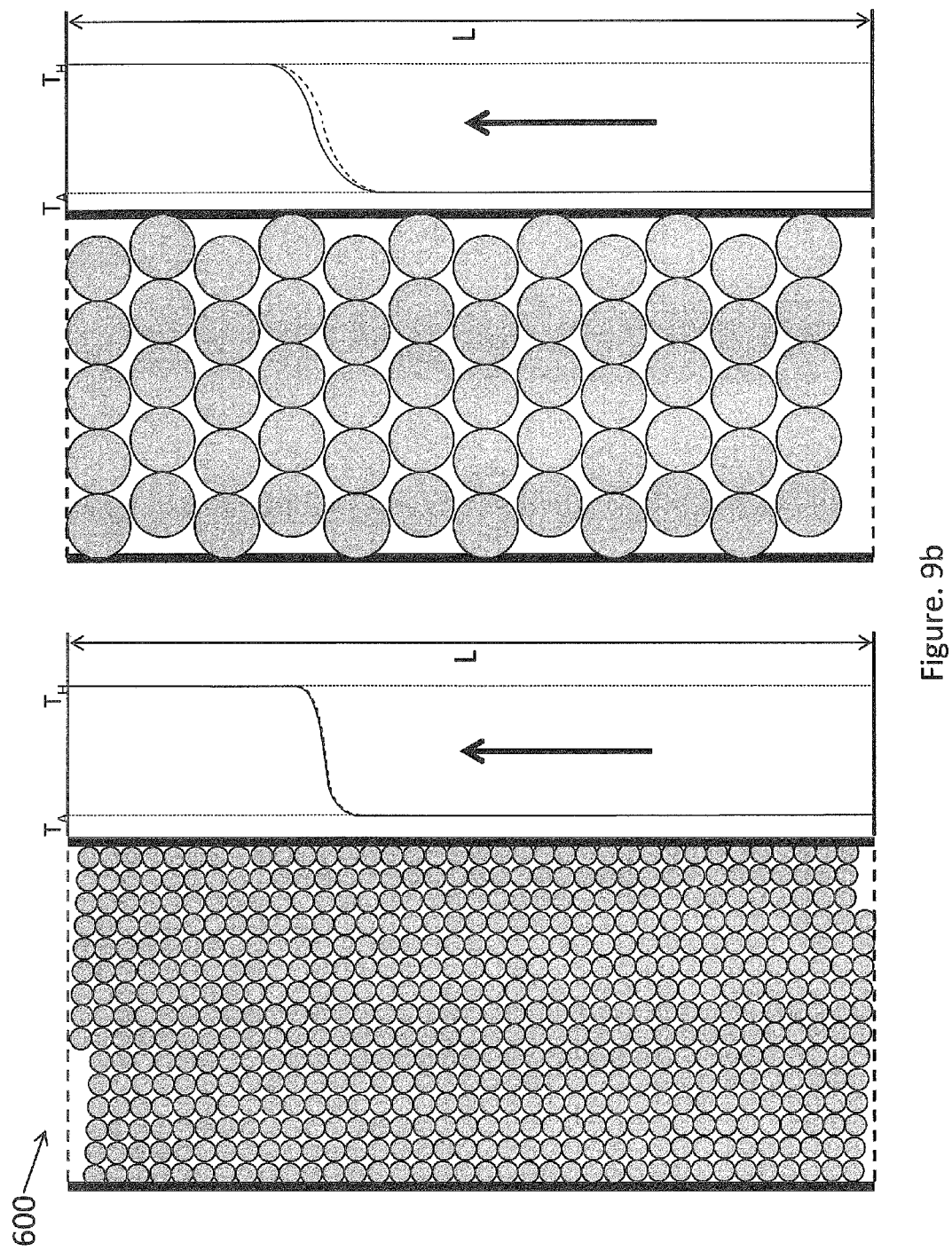
FIG. 9b shows the electricity storage system of FIG. 9a during a discharging phase.

FIG. 9b shows the stores 610, 640 discharging during a discharge phase and in this case the thermal fronts have reversed, so that the gas temperature lags the particle temperature.

Figure 10:
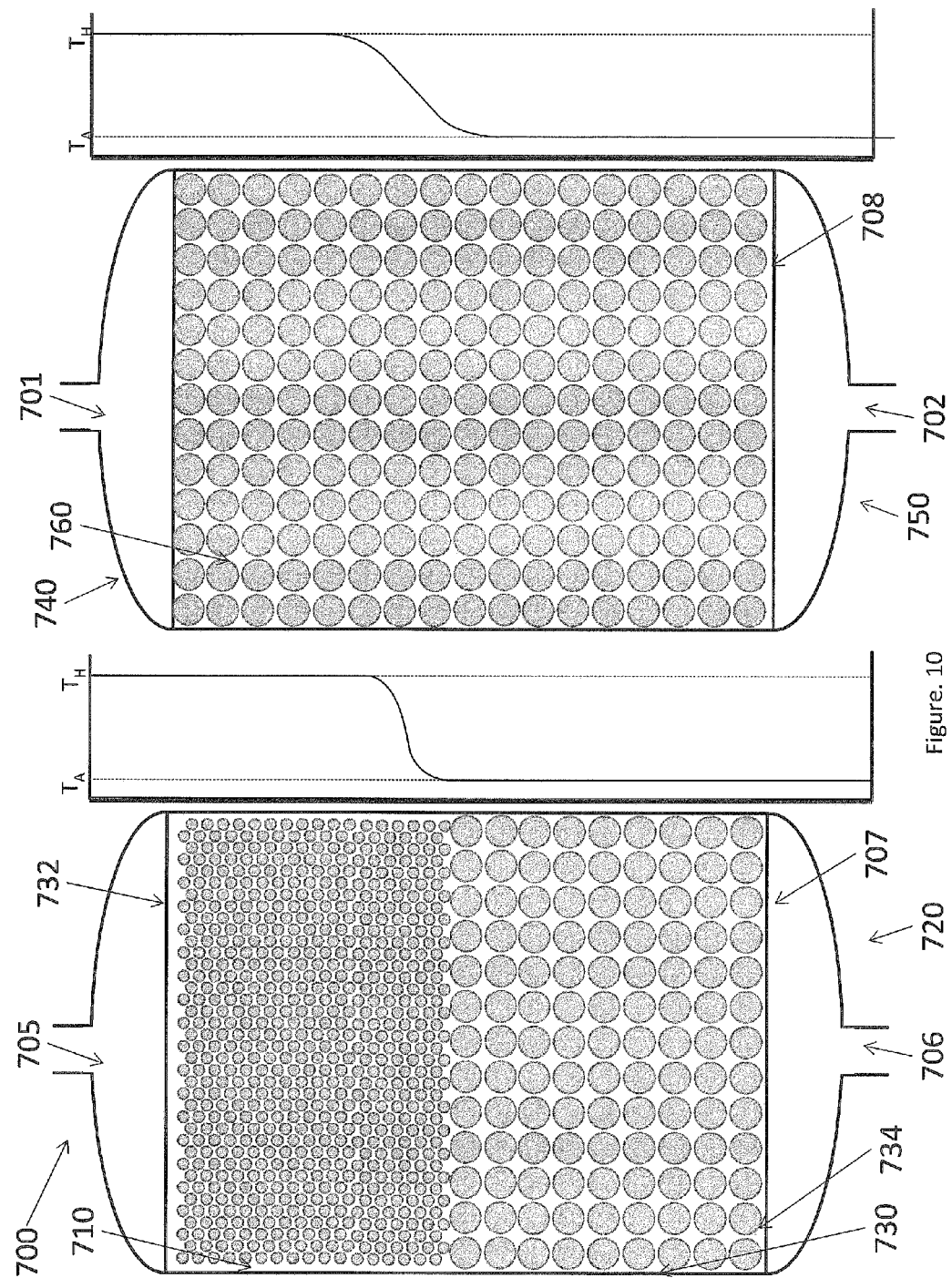
FIG. 10 shows a schematic illustration of an electricity storage system according to a yet further embodiment of the present invention during a charging phase.

FIG. 10 shows a thermal store 700 comprising a high pressure storage vessel 710 and a low pressure storage vessel 740 connectable thereto. Heat storage apparatus 700 may form the heat storage part of any of the system of FIGS. 1-6 previously described.

High pressure storage vessel 710 comprises a high pressure heat store 720 comprising a high pressure heat storage structure 730, inlet 705 for receiving a heated high pressure gas during a charging phase and an outlet 706 for transferring gas to low pressure storage vessel 740. High pressure heat storage structure 730 comprises a first layer of closely packed particulate matter 732 and a second layer of closely packed particulate matter 734 on media support structure 707. The first layer of particulate matter 732 has a smaller mean particle size and hence higher specific surface than the second layer of particulate matter 734. The first layer of particulate matter 732 also has a smaller void fraction than the second layer of particulate matter 734: the first layer of particulate matter 732 having a closed pack hexagonal void fraction of approximately 25% compared with the second layer of particulate matter 734 having a simple cubic packing void fraction of approximately 50% (although in practice the particles may be randomly packed which will achieve differing void fractions depending upon the geometry of the particles).

Low pressure storage vessel 740 comprises a low pressure heat store 750 comprising a low pressure heat storage structure 760, inlet 701 for receiving heated low pressure gas during a charging phase and an outlet 702. Low pressure heat storage structure 760 comprises closely packed particulate matter 708 having a mean particle size and void fraction similar to that of the second layer of particulate matter 734 in the high pressure thermal store 710.

When in use high pressure storage vessel 710 is being charged with heat gas at high pressure enters from the top via inlet 705 and passes through high pressure heat store 720 while cooling and transferring heat to the particulate matter contained in the high pressure heat storage structure 730. Similarly, when heated gas is subsequently transferred to low pressure storage vessel 740 gas at low pressure enters from the top via inlet 701 and passes through low pressure heat store 750. T passage of heated gas through the heat stores creates a thermal front that is shown in the graph next to each store. It can be seen that the thermal front that is in the first layer of particulate matter 732 in the high pressure heat store 720 is much steeper than that in low pressure heat store with just the large particles. As the front in the high pressure heat store passes into the second layer of particulate matter 734 containing larger particles it will in become more shallow. However, the loss in available energy associated with the creation of the thermal front in the second layer of particulate matter 734 is less than for a store containing particulate matter with a mean particle size corresponding to that of the second layer of particulate matter 734 thereby allowing more energy to be recovered by the high pressure heat store 720. The change in particle size can be progressive and is further improved if this is done in by progressively increasing the particle size. In this example there are just two particle sizes, but this approach could have 3 or 4 or more particle sizes.

Figure 11:
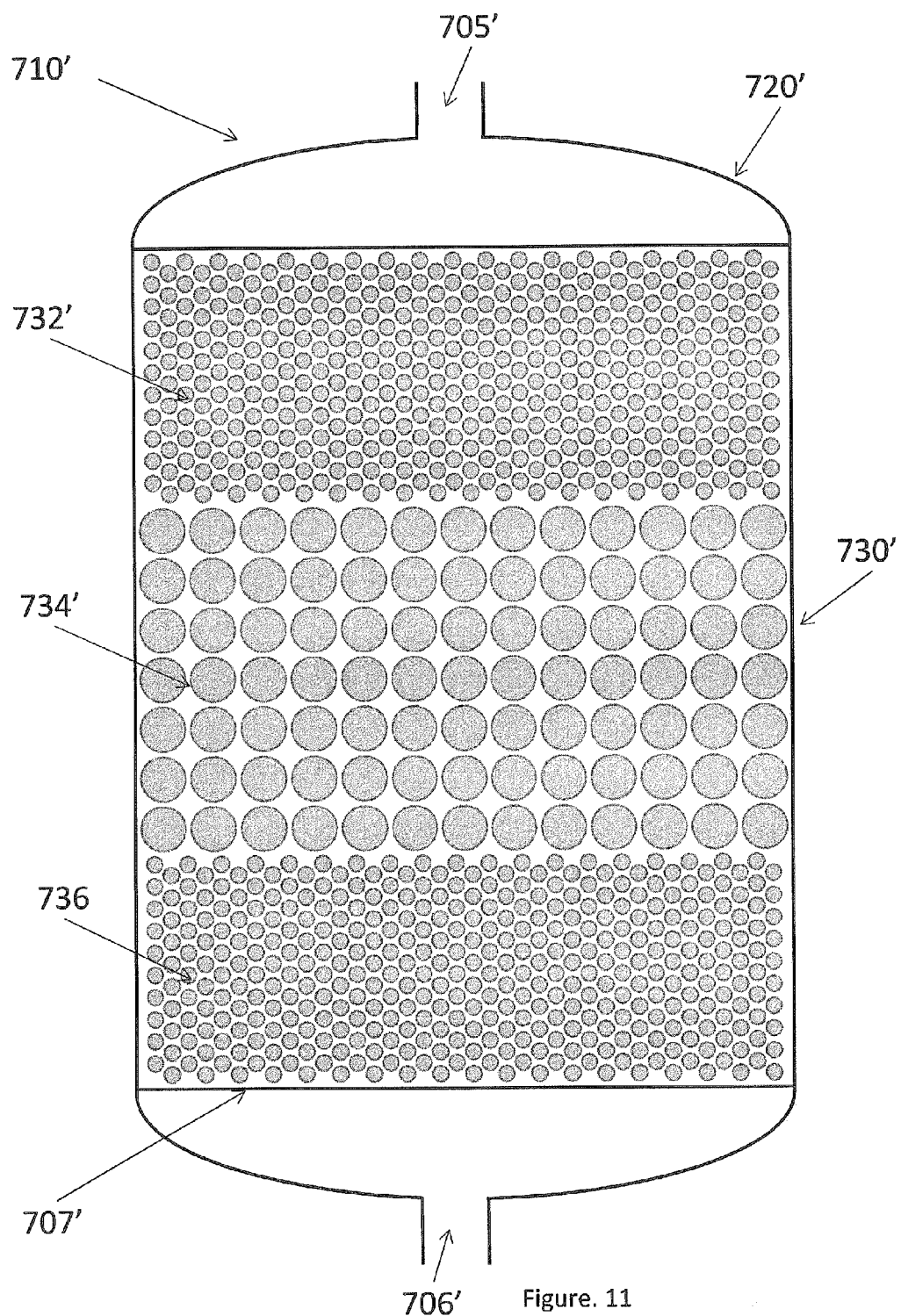
FIG. 11 shows a schematic illustration of a high pressure thermal store for use in the electricity storage system of FIG. 10.

FIG. 11 shows an alternative storage vessel 710' for use in thermal store 700 or thermal store 740.

Storage vessel 710' comprises a heat store 720' comprising a heat storage structure 730', and inlet 705' for receiving gas during a charging phase and an outlet 706'. High pressure heat storage structure 730' comprises a first layer of closely packed particulate matter 732', a second layer of closely packed particulate matter 734' and a third layer of closely packed particulate matter 736 on media support structure 707'. Thermal media 732' and 736 has a smaller particle size and hence higher specific surface than thermal media 734'. This also means that there is a greater pressure drop and lower temperature difference when gas passes through the storage media 732' and 736. Advantageously, the provision of third layer 736 allows storage vessel 710' to receive gas in both directions.

The invention claimed is:

1. Apparatus for storing energy, comprising:
a high pressure storage vessel for receiving a high pressure gas, the high pressure storage vessel comprising a high pressure heat store configured to receive thermal energy from the high pressure gas;
wherein the high pressure storage vessel is configured for connection to a gas store for storing pressurised gas after exposure to the high pressure heat store or to gas processing equipment for receiving pressurised gas after exposure to the high pressure heat store;
wherein the apparatus further comprises:
a low pressure storage vessel comprising a low pressure heat store configured to receive thermal energy from a low pressure gas, the low pressure storage vessel being configured for selective connection to the high pressure storage vessel for a transfer process in which thermal energy is transferred from the high pressure heat store to the low pressure heat store; and
gas transfer equipment for transferring gas at low pressure between the high pressure storage vessel and the low pressure storage vessel, wherein stored thermal energy is transferred between the high pressure heat store and the low pressure heat store by passing the low pressure gas between the high pressure storage vessel and the low pressure storage vessel, the low pressure gas passing through the high pressure heat store where the thermal energy is transferred to the low pressure gas, and then passing through the low pressure heat store where the low pressure gas transfers the thermal energy to the low pressure heat store.

2. Apparatus according to claim 1, wherein the apparatus is configured to lower the gas pressure within the high pressure storage vessel prior to connection of the high pressure storage vessel to the low pressure storage vessel.

3. Apparatus according to claim 1, wherein the apparatus is configured to increase the as pressure within the high pressure storage vessel, after disconnection of the high pressure storage vessel from the low pressure storage vessel.

4. Apparatus according to claim 1, wherein the apparatus comprises a further high pressure storage vessel for receiving high pressure gas, the further high pressure storage vessel being connectable to the gas store or the gas processing equipment via a connection between the high pressure storage vessel and the gas store and comprising a further high pressure heat store for receiving thermal energy from gas.

5. Apparatus according to claim 4, wherein the high pressure storage vessel and the further high pressure storage vessel are configured to be alternately chargeable.

6. Apparatus according to claim 5, wherein the apparatus is configured to continuously supply gas to the high pressure storage vessel and the further high pressure storage vessel.

7. Apparatus according to claim 1, wherein the apparatus comprises a further low pressure storage vessel comprising a further low pressure heat store for receiving thermal energy from gas.

8. Apparatus according to claim 7, wherein the further low pressure storage vessel is selectively connectable to at least one of the high pressure storage vessel or the further high pressure storage vessel.

9. Apparatus according to claim 7, wherein the apparatus is configured to charge the low pressure heat store and the further low pressure heat store in series.

10. Apparatus according to claim 7, wherein the apparatus is configured to charge the low pressure heat store and the further low pressure heat store in parallel.

11. Apparatus according to claim 7, wherein the low pressure storage vessel maintains gas at a first pressure and the further low pressure storage vessel maintains gas at a second pressure different to the first pressure.

12. Apparatus according to claim 4, wherein the apparatus comprises at least two yet further high pressure storage vessels for receiving high pressure gas, each yet further high pressure storage vessel being connectable to the gas store or the gas processing equipment via the connection and comprising a yet further high pressure heat store for receiving thermal energy from gas.

13. Apparatus according to claim 12, wherein the apparatus is operable in a charging mode in which at any one time: one of the high pressure storage vessels is being charged with gas; one of the high pressure storage vessels contains gas having its pressure reduced; one of the high pressure storage vessels contains gas being transferred between the high pressure storage vessel and the low pressure storage vessel by the gas transfer equipment; and one of the high pressure storage vessels contains gas having its pressure increased.

14. Apparatus according to claim 13, wherein the apparatus comprises at least one yet further high pressure storage vessel for receiving high pressure gas, the at least one yet further high pressure storage vessel being connectable to the gas store or the gas processing equipment via the connection and comprising a yet further high pressure heat storage means store for receiving thermal energy from gas.

15. Apparatus according to claim 1, wherein the low pressure storage vessel or a further low pressure storage vessel stores gas at atmospheric pressure.

16. A method of storing and subsequently retrieving energy, comprising:
during a charge phase:
receiving a heated high pressure gas;
transferring the high pressure gas to a gas store or gas processing equipment via a high pressure storage vessel comprising a high pressure heat store that receives and stores thermal energy from the gas;
selectively connecting a low pressure storage vessel to the high pressure storage vessel for a transfer process;
the transfer process comprising transferring gas from the high pressure storage vessel at low pressure between the high pressure storage vessel and the low pressure storage vessel comprising a low pressure heat store that receives and stores thermal energy from gas, wherein thermal energy stored by the high pressure heat store is transferred to the low pressure heat store by low pressure gas passing between the high pressure storage vessel and the low pressure storage vessel, the low pressure gas passing through the high pressure heat store where the thermal energy is transferred to the low pressure gas, and then passing through the low pressure heat store where the low pressure gas transfers the thermal energy to the low pressure heat store; and during a discharge phase:
transferring gas between the low pressure storage vessel and the high pressure storage vessel at low pressure, wherein thermal energy stored by the low pressure heat store is transferred to the high pressure heat store by low pressure gas passing between the low pressure storage vessel and the high pressure storage vessel, the low pressure gas passing through the low pressure heat store where the thermal energy is transferred to the low pressure gas, and then passing through the high pressure heat store where the low pressure gas transfers the thermal energy to the high pressure heat store;
subsequently passing gas at high pressure through the high pressure storage vessel to expose the high pressure gas to the high pressure heat store to heat the gas by transferring the stored thermal energy to the gas; and
expanding the heated high pressure gas.

17. A method according to claim 16, wherein gas is transferred cyclically between the high pressure storage vessel and the low pressure storage vessel during the charge phase, or is transferred cyclically between the low pressure storage vessel and the high pressure storage vessel during the discharge phase.

18. A method of storing and subsequently retrieving energy, comprising:

during a charge phase;
receiving a heated low pressure gas;
passing the low pressure gas through a low pressure storage vessel comprising a low pressure heat store for receiving thermal energy from the gas; and during a discharge phase:
selectively connecting the low pressure storage vessel to a high pressure storage vessel for a transfer process;
the transfer process comprising transferring gas from the low pressure storage vessel at low pressure between the low pressure storage vessel and the high pressure storage vessel comprising a high pressure heat store for receiving thermal energy from the gas, wherein thermal energy stored by the low pressure heat store is transferred to the high pressure heat store by low pressure gas passing between the low pressure storage vessel and the high pressure storage vessel, the low pressure gas passing through the low pressure heat store where the thermal energy is transferred to the low pressure gas, and then passing through the high pressure heat store where the low pressure gas transfers the thermal energy to the high pressure heat store;
subsequently passing gas at high pressure through the high pressure storage vessel to expose the gas to the high pressure heat store; and
expanding the heated high pressure gas.

19. Apparatus according to claim 1, wherein the gas transfer equipment comprises a pump.

20. Apparatus according to claim 1, wherein the low pressure storage vessel is disposed in a circuit such that the low pressure storage vessel is selectively connectable to the high pressure storage vessel so as to form a closed circuit that allows gas to be transferred cyclically between the high pressure storage vessel and the low pressure storage vessel during the charge phase, or to be transferred cyclically between the low pressure storage vessel and the high pressure storage vessel during the discharge phase.

* * * * *